United States Patent [19]
Furuyama et al.

[11] Patent Number: 5,559,918
[45] Date of Patent: Sep. 24, 1996

[54] OPTICAL SEMICONDUCTOR MODULE IN WHICH A HERMETICALLY SEALED OPTICAL SEMICONDUCTOR DEVICE IS CONNECTED TO AN ELECTRICAL WIRING LAYER

[75] Inventors: Hideto Furuyama, Yokohama; Hiroshi Hamasaki, Sagamihara; Tamon Kobayashi, Tokyo, all of Japan

[73] Assignee: Kabushiki Kaisha Toshiba, Kawasaki, Japan

[21] Appl. No.: 379,282

[22] Filed: Jan. 27, 1995

Related U.S. Application Data

[62] Division of Ser. No. 160,919, Dec. 3, 1993, Pat. No. 5,412,748.

[30] Foreign Application Priority Data

Dec. 4, 1992 [JP] Japan .................................. 4-325210
Sep. 16, 1993 [JP] Japan .................................. 5-229781

[51] Int. Cl.$^6$ .............................. G02B 6/00; G02B 6/36
[52] U.S. Cl. ................................................................ 385/92
[58] Field of Search .............................. 385/88, 92, 132, 385/143, 145, 80, 89, 76, 77

[56] References Cited

U.S. PATENT DOCUMENTS 5,218,663  6/1993  Isono et al. .............................. 385/129
5,259,054  11/1993 Benzoni et al. .......................... 385/89
5,265,184  11/1993 Lebby et al. ............................. 385/132

Primary Examiner—Akm E. Ullah
Attorney, Agent, or Firm—Oblon, Spivak, McClelland, Maier & Neustadt, P.C.

[57] ABSTRACT

An optical semiconductor module includes a submount body having a groove buried with an insulator, an optical semiconductor device mounted on the submount body, a cap, arranged across the groove on the submount body and bonded and fixed to the submount body by a bonding member, for hermetically sealing the optical semiconductor device, and an electrical wiring layer arranged to extend from the outside of the cap on the submount body to the inside of the cap through the groove buried with the insulator. The electrical wiring layer is electrically connected to the optical semiconductor device.

16 Claims, 29 Drawing Sheets

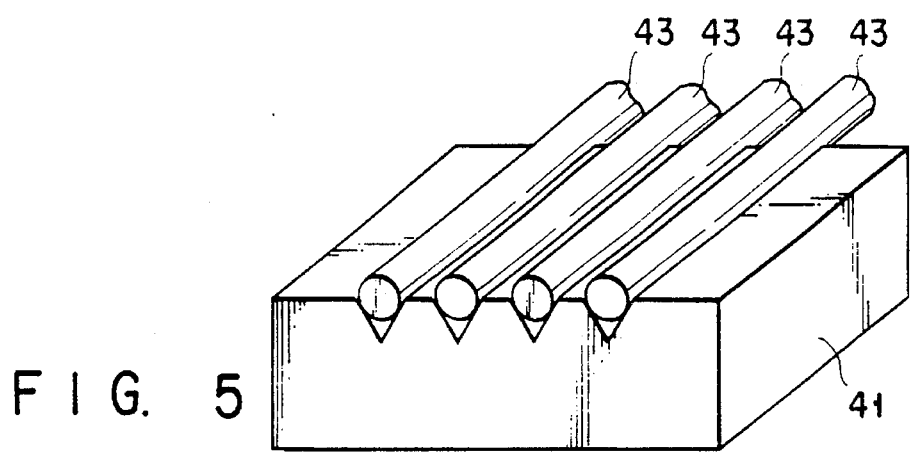
F I G. 5
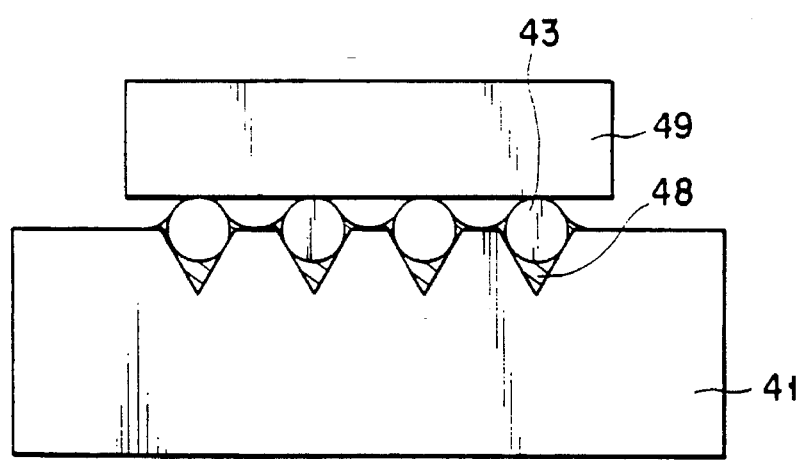
F I G. 6
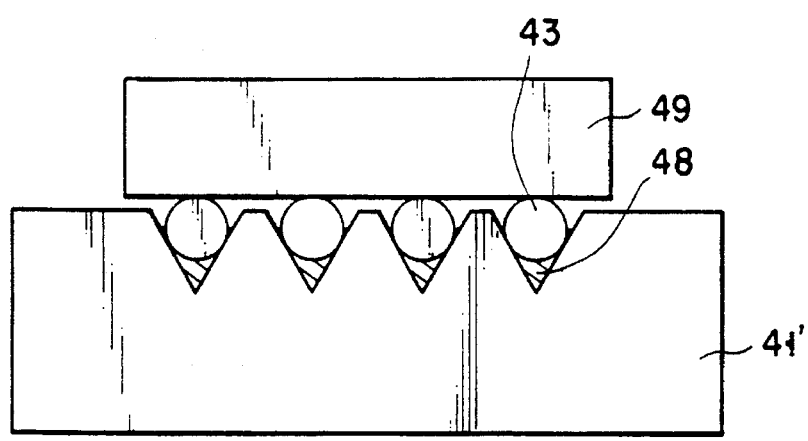
F I G. 7

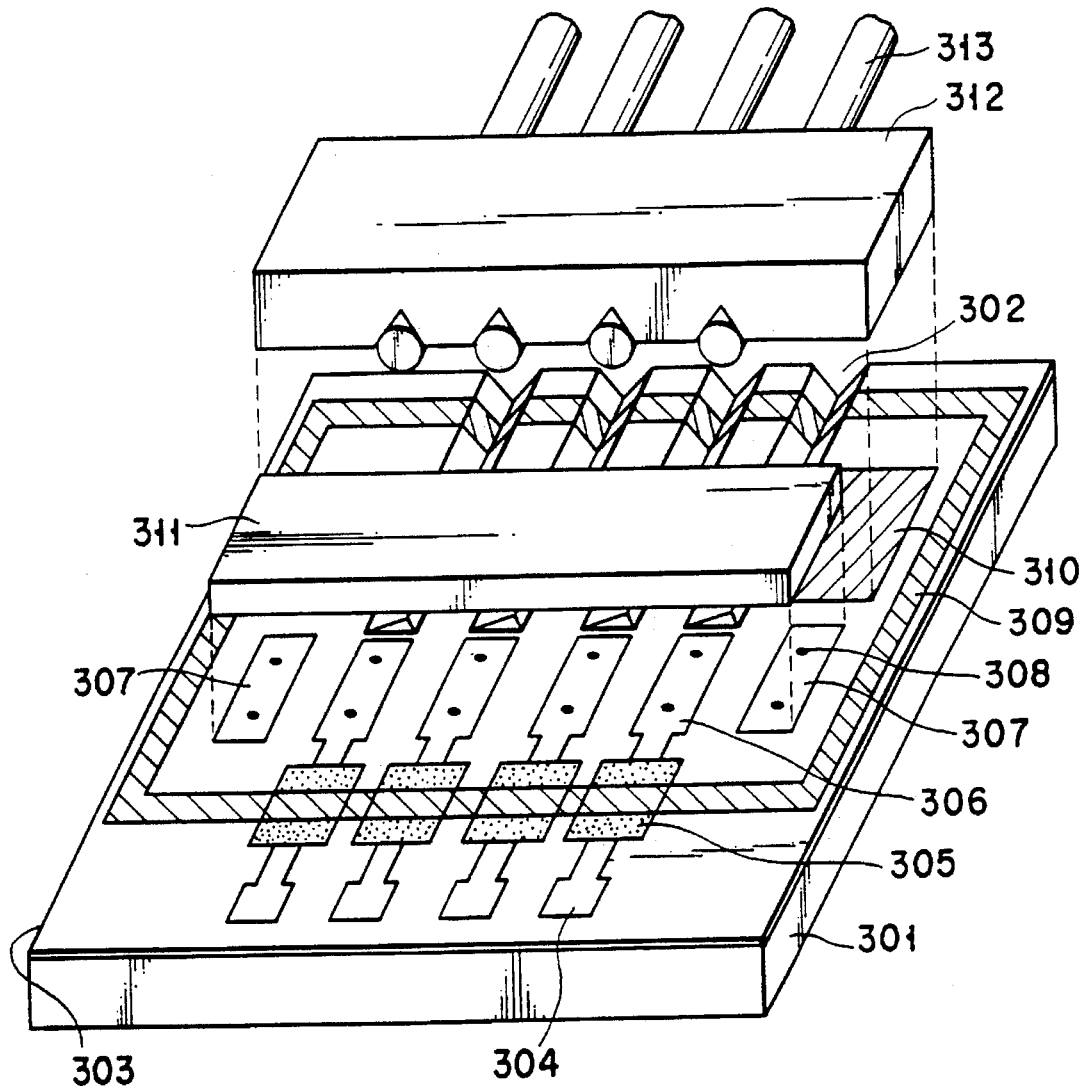
F I G. 20

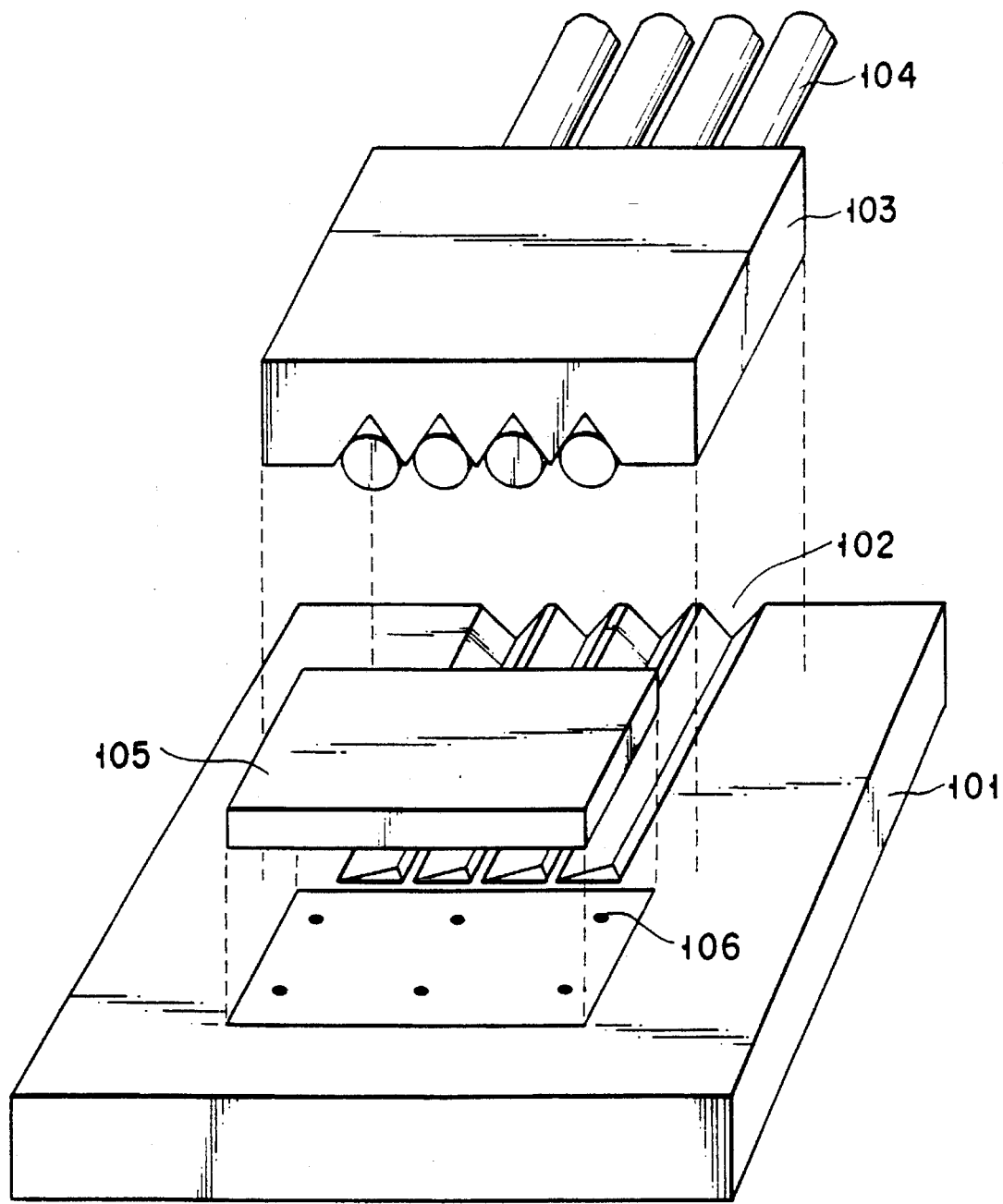
F I G. 21

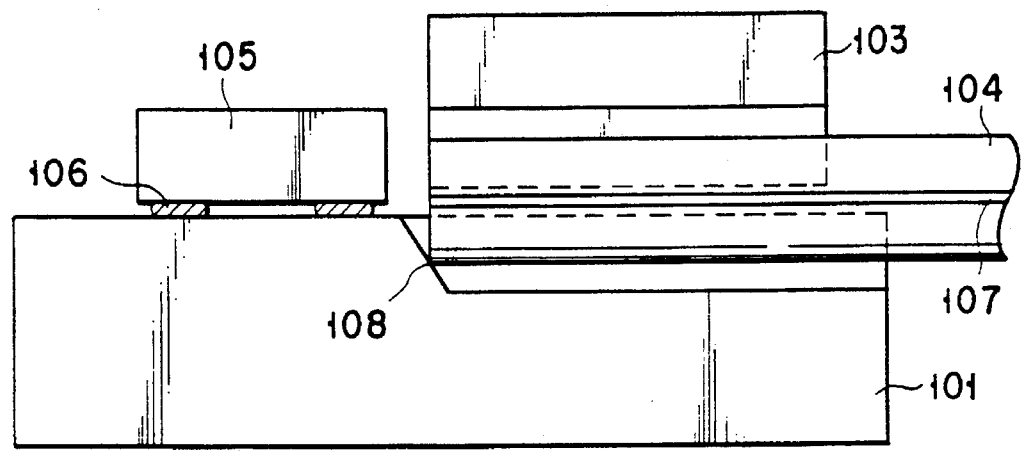
F I G. 22A
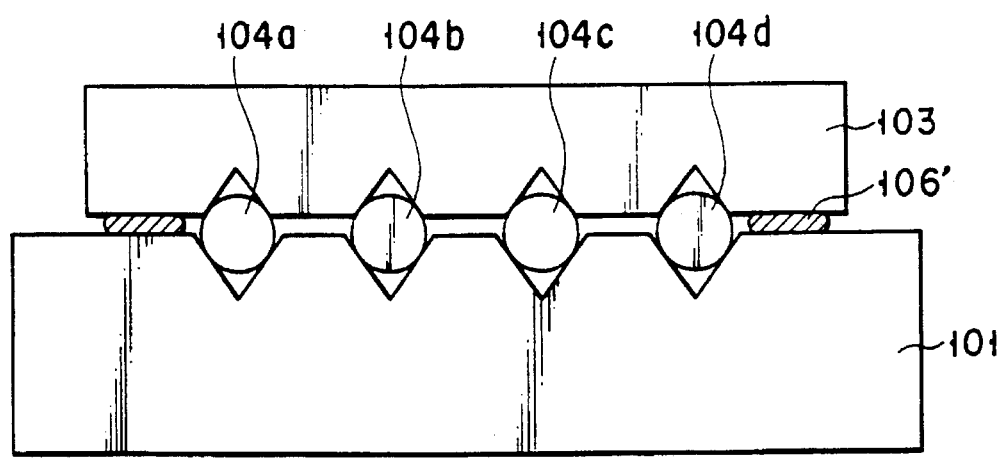
F I G. 22B

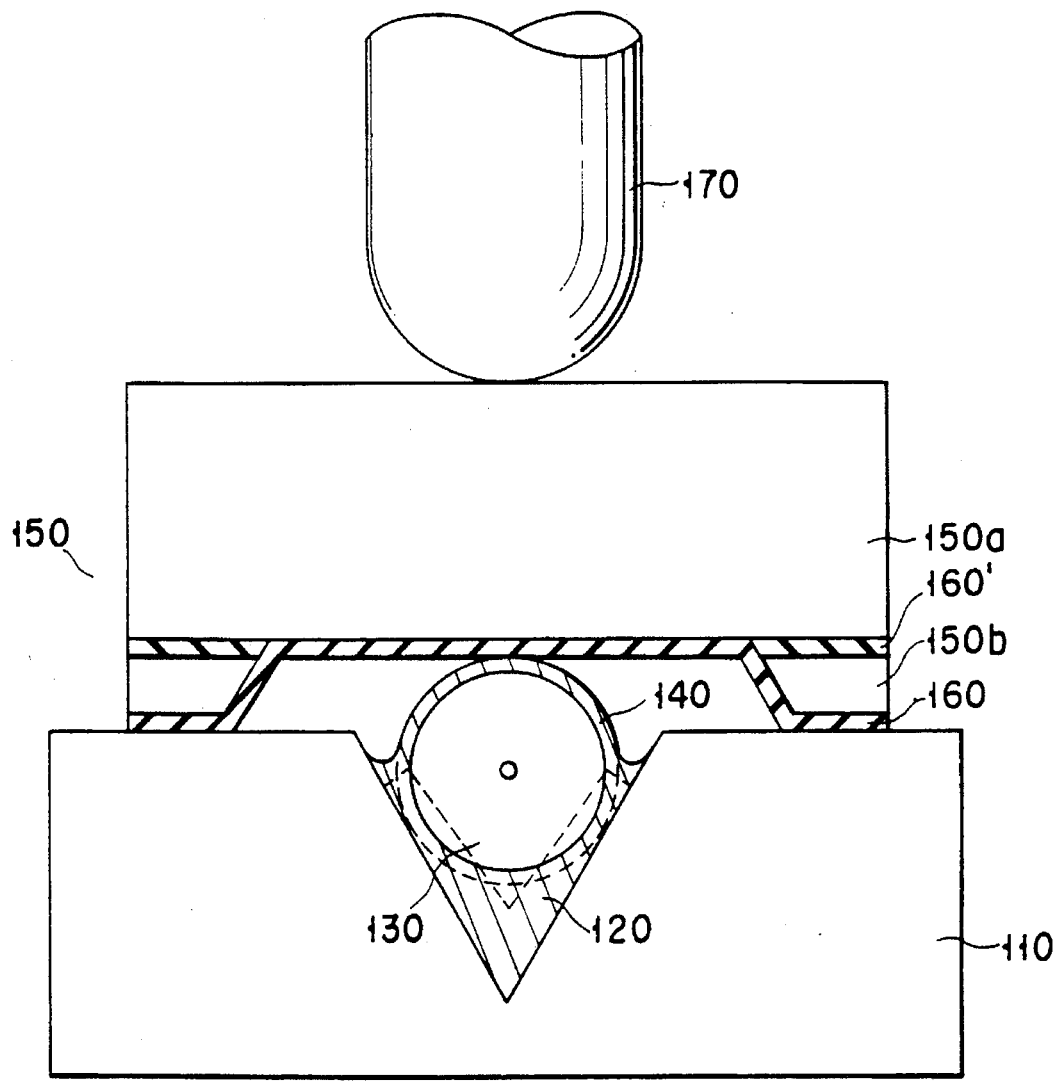
F I G. 26

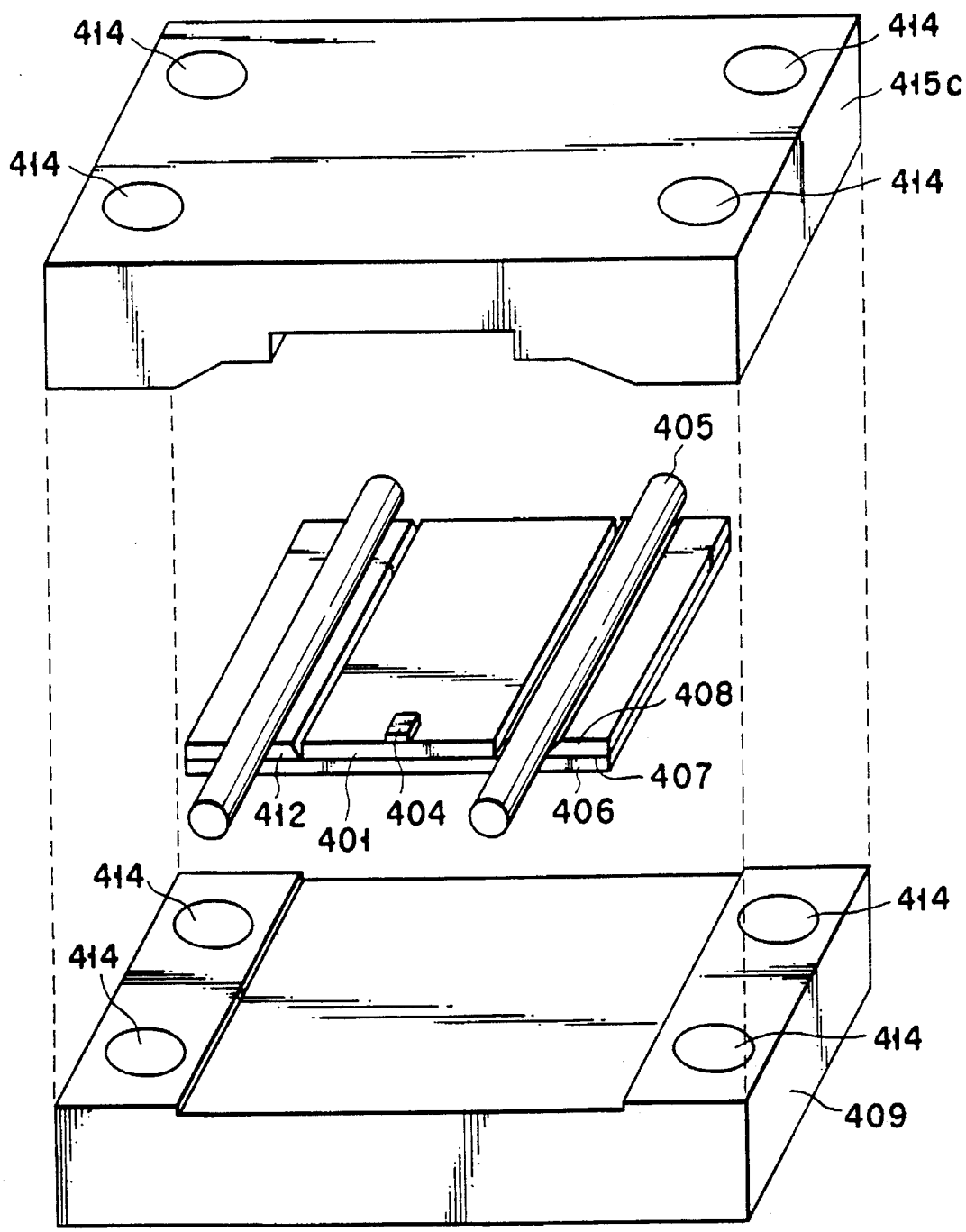
F I G. 31

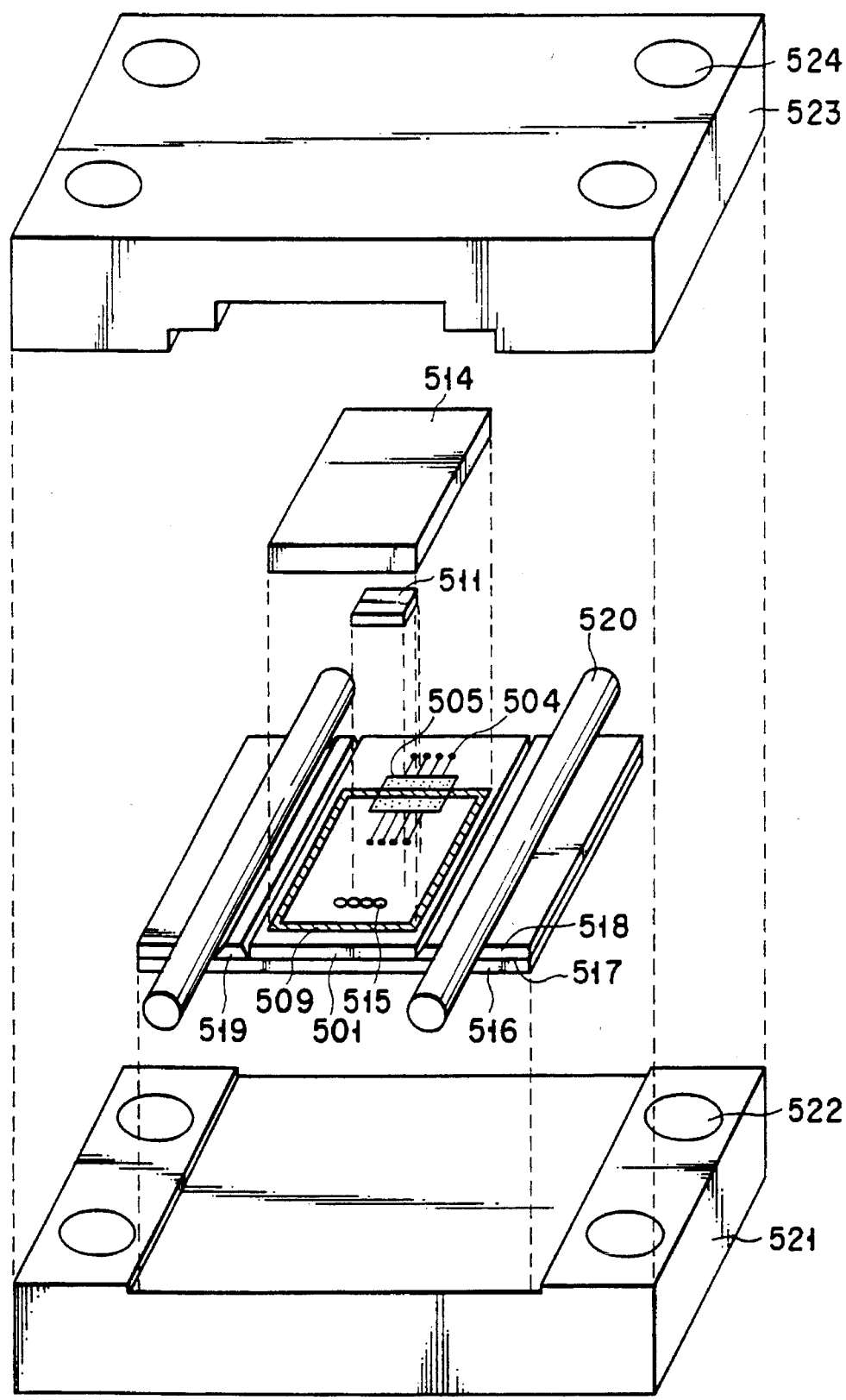
F I G. 35

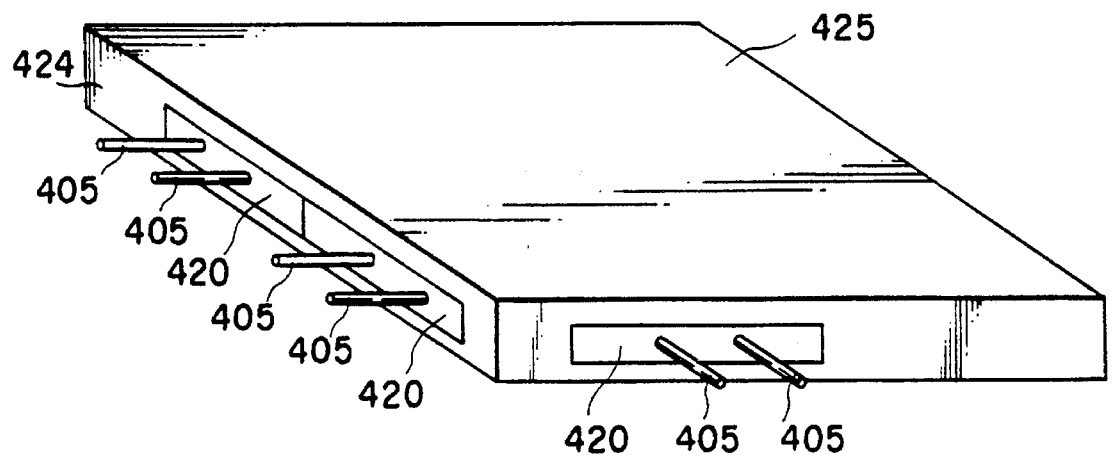
F I G. 39A
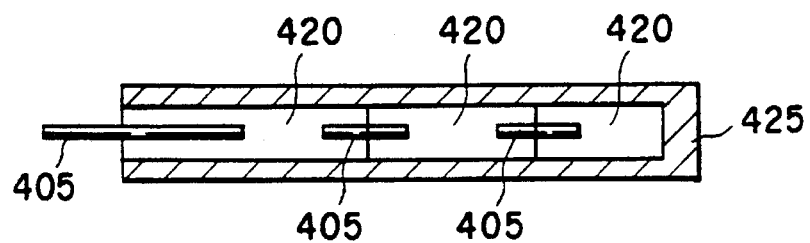
F I G. 39B

OPTICAL SEMICONDUCTOR MODULE IN WHICH A HERMETICALLY SEALED OPTICAL SEMICONDUCTOR DEVICE IS CONNECTED TO AN ELECTRICAL WIRING LAYER

This is a division of application Ser. No. 08/160,919 filed on Dec. 3, 1993, now U.S. Pat. No. 5,412,748.

BACKGROUND OF THE INVENTION

1. Field of the Invention

The present invention relates to an optical semiconductor module obtained by mounting an optical semiconductor device such as a semiconductor laser on a modular substrate for an optical coupling and, more particularly, to an optical semiconductor module in which a coupling mechanism between optical semiconductor devices and optical fibers, a hermetically sealed capping structure, and a connecting mechanism using guide pins are improved.

2. Description of the Related Art

Semiconductor devices are generally subjected to hermetic sealing or plastic molding to prevent its degradation caused by humidity, dust, and ions in the atmospheric air. In particular, since optical semiconductor devices have optical input/output surfaces which can be easily contaminated, a normal package has a hermetic sealing structure. Hermetic sealing employs a method of mounting a metal or ceramic substrate having a semiconductor device on a package consisting of a metal or the like and having terminals insulated with glass, and mounting a cap consisting of a metal or the like on the package by soldering, welding, or the like.

A hermetic sealing package is shown in FIG. 1. Referring to FIG. 1, reference numeral 1 denotes an optical semiconductor device. This optical semiconductor device 1 is mounted on an Si submount 2 mounted on a metal stem 5. The Si submount 2 is used to prevent distortion caused by a difference between the thermal expansion coefficients of the metal stem and the optical semiconductor devices. Reference numeral 3 denotes each metal lead sealed to be insulated from the metal stem 5 by glass 4.

The optical semiconductor device 1 is electrically connected to the metal leads 3 by bonding wires 7. Reference numeral 6 denotes a metal cap; and 8, an external light incident/exit window. The window 8 is hermetically and integrally bonded to the metal cap 6. The metal cap 6 is welded to the metal stem 5, and the optical semiconductor device 1 is hermetically sealed by the above members.

when an optical semiconductor module is used as an optical transmitter for communication or information processing systems, fiber coupling is generally used as the signal transmission medium. In this manner, when the optical semiconductor module is to be coupled to an optical fiber, the following method is employed. That is, the optical fiber is fixed to a fiber holder such as a sleeve, the optical axes of an optical semiconductor device and the optical fiber are adjusted to each other, and a fiber holder is fixed to the package by laser welding or the like. As a consequence, the size of the entire optical semiconductor module becomes very large compared with the optical fiber and the optical semiconductor device chip.

Therefore, a device obtained by of fixing an optical semiconductor device and an optical fiber in a metal package and hermetically sealing them at once is known as an optical semiconductor module including an optical coupling system therein. FIG. 2 shows this optical semiconductor module. Referring to FIG. 2, reference numeral 11 denotes an optical semiconductor device which is mounted on an Si submount 12. Reference numeral 15 denotes an optical fiber which is fixed on a sleeve 16. Reference numeral 13 denotes a metal package including a structure having a base 14, 17 on which the Si submount 12 and the optical fiber 15 can be fixed.

After the optical axis of the optical fiber 15 is aligned with that of the optical semiconductor device 11, the optical fiber 15 is fixed on a base 17 with an adhesive 18 such as an ultraviolet-curing adhesive. The sleeve 16 and a package 13 are hermetically bonded to each other by welding using a solder. Reference numeral 19 denotes a lid hermetically bonded to the package 13 by welding or the like. Reference numeral 20 denotes each hermetic terminal insulated from the package 13 by glass to electrically connect the optical semiconductor device to an external circuit. In this case, since the optical semiconductor device and the optical fiber are sealed at once, this optical semiconductor module can be smaller than the above-mentioned optical semiconductor module shown in FIG. 1 in overall size. However, since the hermetic terminals and the sleeve are required, a reduction in size of the device is limited.

In addition, when an optical semiconductor device is to be used, an electric circuit for driving the optical semiconductor device must be connected outside the device. An example wherein the external electric circuit is connected to the device will be described below. A method in which several semiconductor device chips are mounted on one substrate and packaged at once is known. In particular, a multi-chip mounting method in which devices are mounted as bare chips on a substrate and hermetically sealed at once is advantageous to integration. However, in the module using optical semiconductor devices, the optical semiconductor devices form an optical submodule using an independent package hermetically sealed, and the optical submodule is connected to an external electric circuit and then sealed at once. Therefore, an optical semiconductor device is often packaged in a double structure.

In this case, since the optical semiconductor device is packaged by a metal, an Si submount is required to prevent distortion caused by the difference between the thermal expansion coefficients of the optical semiconductor device and the metal. Therefore, the optical semiconductor device is mounted on the Si submount and then hermetically sealed. For this reason, the package is larger than an electronic semiconductor device in size, and the size of the whole module is considerably increased by using the optical semiconductor device.

On the other hand, an optical semiconductor module in which an optical semiconductor device such as a semiconductor laser or a photodetector is optically coupled to an optical fiber is much more expensive than a normal semiconductor module such as a transistor or an integrated circuit. This is not because of the manufacturing cost of the optical semiconductor device, but mainly because of the coupling adjustment cost between optical semiconductor devices and optical fibers. A reduction in coupling adjustment cost is considerably difficult.

Therefore, an optical semiconductor module which can be mass-produced at low cost has been demanded, and several attempts have been reported or proposed. Of these attempts, especially, an optical semiconductor module obtained by applying a so-called micromachining technique using the semiconductor manufacturing technique has received a great deal of attention. The characteristic feature of the optical semiconductor module obtained by applying the micromachining technique lies in that mechanical processing on the order of submicron, i.e., 1 μm or less, developed by the semiconductor device manufacturing technique makes it possible to perform optical axis adjustment between optical semiconductor devices and optical fibers by only a mechanical assembly process, and a large number of optical semiconductor devices can be manufactured at once like normal semiconductor devices.

FIG. 3A is a perspective view showing a conventional optical semiconductor module as one of mass-produced optical semiconductor modules free from optical axis adjustment by applying the above micromachining technique. Reference numeral 31 denotes a modular substrate in which a guide groove 32 for adjusting the position of an optical fiber is formed and which has optical semiconductor device mounting electrodes 36. Reference numeral 34 denotes an optical fiber; and 35, an optical semiconductor device, e.g., an edge emission type semiconductor laser.

In this case, the module substrate 31 consists of Si crystal as its material. The guide groove 32 is formed in the module substrate 31 using photolithography and a chemical etching technique which are the same as those of the process of manufacturing a semiconductor device, and the electrodes 36 are similarly formed in the module substrate 31 using photolithography and a evaporate deposition technique. At this time, when so-called solder bumps are used as the electrodes 36, the optical semiconductor device 35 can be precisely positioned in a self-aligned manner by the well-known function of a surface tension of the solder bumps.

On the other hand, since the optical fiber 34 is mechanically fitted in the groove 32, the optical fiber 34 can be precisely positioned. In this manner, the optical semiconductor device 35 and the optical fiber 34 which are positionally adjusted are mounted on the modular substrate 31, and the resultant structure is arranged in the outer case of a module, thereby completing an optical semiconductor module.

FIG. 3B is a sectional view showing the optical semiconductor module shown in FIG. 3A along its optical axis. Reference numeral 37 denotes the core of the optical fiber, i.e., an optical waveguide portion. The optical semiconductor device 35 has electrodes each having the same shape as that of each of the electrodes 36, the electrode surface of the optical semiconductor device 35 faces down. The electrodes are electrically connected to the electrodes 36, and at the same time, as described above, the optical semiconductor device 35 is mechanically adjusted to a predetermined position of the modular substrate 31 by the surface tension of the solder material in the process of melting the electrodes 36. At this time, the thickness of each of the electrodes 36 and the shape and depth of the guide groove 32 of the optical fiber 34 are determined in advance such that the core 37 of the optical fiber is matched with the active portion of the optical semiconductor device 35.

In the optical semiconductor module manufactured as described above, the precision of machining and mounting can be set to be 1 μm or less. The optical semiconductor module can be theoretically manufactured by only a mechanical assembly process. All important technical points of the process are the application of the semiconductor technique device manufacturing, necessary parts has a high processing precision, and a large number of parts are manufactured at once, i.e., on a large number of semiconductor wafers at once. Therefore, the optical semiconductor device requires no optical axis adjustment process, and an automatic mechanical assembly process allows mass production and a great reduction in cost.

In an optical semiconductor module of this type, although mass production and the reduction in cost can be achieved as compared with the conventional optical semiconductor module requiring optical axis adjustment, the reproducibility of temperature characteristics and optical coupling characteristics poses problems because incompleteness of a self-aligning mechanism is left in control for mounting the optical fiber at a position along the optical axis, the optical axis is changed by the thermal expansion of the members caused by a change in temperature, and the like. These causes will be described below.

The module substrate 31 shown in FIGS. 3A and 3B uses anisotropic etching of Si to control the shape and depth of the guide groove 32 of the optical fiber 34 such that the shape and size of the guide groove 32 of the optical fiber 34 are automatically determined by the precision of photolithography. The anisotropic etching of Si crystal utilizes a sharp decrease in etching rate on the (111) plane, and can form various geometrical shapes using an etching-initiating crystal face and the shapes of a mask. A combination for uniquely determining the width and depth of the guide groove is a combination for etching a substrate aligning a slit-like mask on the (001) plane in the <110> or <1-10> direction. In this case, a V-groove is formed in the <110> or <1-10> direction, and the depth of the groove can be determined by the width of the mask.

However, an end portion of the guide groove 32, i.e., the terminal end portion of the guide groove 32 for receiving the optical fiber 34 has no vertical wall but an inclined wall having an inclination angle as that of the V-groove. For this reason, the lower portion of the end face of the optical fiber 34 is brought into contact with a terminal end portion 38 of the V-groove, thereby determining the position of the optical fiber 34 along the optical axis. However, this causes the degradation of reproducibility of temperature characteristics and optical coupling characteristics. FIG. 4A shows this state. The end portion of the optical fiber 34 is bent by the inclined surface of the terminal end portion 38 of the guide groove to decenter the optical axis (broken line 34').

When the optical fiber 34 is bent as indicated by reference numeral 34' in FIG. 4A, the core 37 of the optical fiber is easily decentered by several μm, or 10 μm or more depending conditions, and optical coupling is considerably degraded. This bending of the optical fiber occurs when an excessive axial pressure is applied to the optical fiber 34 during assembling the module, or when the difference between the thermal expansion amounts of the optical fiber 34 and the module substrate 31 is increased with a change in ambient temperature after the module is assembled. In addition, the terminal end portion 38 of the guide groove may be spatially separated from the end portion of the optical fiber 34 to solve the above problem. However, in this case, the positional relationship between the optical fiber 34 and the optical semiconductor device cannot be precisely controlled in the optical axis, and the reproducibility of light coupling characteristics cannot be assured.

As described above, in the prior art shown in FIGS. 3A and 3B, although an optical semiconductor module can be theoretically manufactured at low cost in mass production, the optical semiconductor module still has structural or mechanical drawbacks. In addition, these drawbacks are more conspicuous when a plurality of optical fibers are arranged than when a single optical fiber and an optical semiconductor device are used. This is because, when a plurality of optical fibers are used as an optical fiber array, i.e., a so-called ribbon fiber, and the distal end positions of the optical fibers are shifted from each other due to the manufacturing characteristics of the ribbon fiber. FIG. 4B shows this state. Four optical fibers 34a to 34d are banded together as a ribbon fiber by a jacket 39.

In general, this ribbon fiber is formed such that independent optical fibers drawn from different preforms are banded by an ultraviolet-curing resin or the like to form an array. For this reason, the elastic characteristics of the optical fibers are slightly different from each other, and different stresses are applied to the optical fibers by twisting the optical fibers during banding. Therefore, even when the resin of the ribbon fiber is partially removed, and the optical fibers are cut to have a uniform length, the positions of the distal end portions of the optical fibers are changed over time to easily cause variations in length. In addition, even the changes in positions of the distal end portions can be suppressed as small as possible by a careful operation, the positions of the distal end portions are easily changed by heating and cooling operations in assembling the module.

In FIG. 4B, a line A—A' represents a position where the distal end portion is most retreated, and a line B—B' represents a position where the distal end portion is most advanced. The lines A—A' and B—B' are easily shifted by several tens μm. For this reason, when a plurality of optical fibers are used, the problem shown in FIG. 4 is more conspicuously posed.

As described above, in an optical transmission module, an optical switch module, or the like used in optical communication, an optical semiconductor device such as a semiconductor laser or an optical waveguide must be optically coupled to optical fibers. For this purpose, many methods of adjusting optical axes and methods of fixing optical fibers have been proposed.

Most of the conventional methods of adjusting optical axes and fixing optical fibers are as follows. That is, optical axis adjustment is performed by actually transmitting light through an optical fiber so as to obtain a maximum optical coupling value, and respective parts are fixed by some means. Although these methods are used in the process of manufacturing actual products, optical axis adjustment requires skills and a long period of time because fine positional adjustment must be performed. In addition, since optical axes are changed by distortions or stresses during fixing parts, even optical axis adjustment for a long period of time inevitably result in defective products. That is, the manufacturing cost itself is high due to a long manufacturing time, and a loss caused by defective products is higher than a material cost. The manufacturing cost is further increased accordingly.

The method of performing the optical monitoring poses another problem as follows. That is, it is more difficult to manufacture an array of optical fibers, and the yield is decreased by a power of the number of optical fibers in an array compared with the yield of single optical fibers. For this reason, the manufacturing cost considerably is increased, and products may difficult to manufacture depending on the number of optical fibers in an array.

On the other hand, a method of mounting an optical fiber without using optical monitoring is proposed. For example, a method of mounting an optical fiber by a mechanical fitting operation and adjusting the position of the optical fiber with mechanical dimensional precision. According to this method, the optical fiber can be mounted and assembled by mechanically assembling parts. In addition, since a plurality of optical fibers can be basically mounted at once, the number of manufacturing steps and a period of time required for manufacturing the module can be decreased compared with those of a method in which optical monitoring is performed, and losses caused by defective products are almost determined depending on a material cost. This method is especially effective for mounting an optical fiber array. A prior art according to this method is shown in FIG. 5.

Referring to FIG. 5, reference numeral 41 denotes a mounting holder; and 43, optical fibers 43. The mounting holder 41 is formed such that anisotropic chemical etching is performed to, e.g., an Si substrate, to form V-grooves. At this time, when a mask for chemical etching is formed by the same photolithography as that used in the semiconductor process, processing can be performed at a precision of about 1 μm, and a plurality of mounting holders 41 can be formed at once. According to this method, optical fibers can be highly precisely mounted in principle. For example, a method of mounting the optical fibers is performed as shown in FIG. 6.

Referring to FIG. 6, reference numeral 48 denotes an adhesive material for mounting the optical fibers. For example, an ultraviolet-curing resin is used as the adhesive material 48. Reference numeral 49 denotes a press plate for mounting the optical fibers. A flat Si substrate or the like is used as the press plate to uniformly press the optical fibers 43 against the holder 41. The positions of the optical fibers 43 pressed against the mounting holder 41 by this method have been mechanically adjusted, and, in particular, the arrangement precision (mounting pitch) of the optical fibers 43 are very high.

However, in the method of mounting optical fibers by a mechanical fitting operation, the arrangement precision, i.e., a relative positional precision, of the optical fibers is actually high, but an absolute positional precision of the optical fibers is not always assured.

In a conventional optical fiber mounting body, optical fibers are positioned by bringing the optical fibers into contact with the grooves of a mounting holder. For this reason, the conventional mounting holder must have a fine surface state, and a method of processing the mounting holder is almost limited. A conventional jig for mounting the optical fibers has only a function of pressing them against the mounting holder, as shown in FIG. 6. Although this jig can press the optical fibers against the grooves of the mounting holder, positions at which the optical fibers are mounted in the grooves cannot be controlled. That is, the jig is passive with respect to the groove processing precision of the mounting holder, and any correcting means cannot be applied to the mounting jig for the precision of the depth of each groove. The precision of the depth cannot be corrected regardless of changes in external pressure and pressure application angle.

FIG. 7 is a sectional view showing a state wherein the optical fibers 43 are fitted in the grooves of a mounting holder 41' in which the grooves deeper than the grooves of the mounting holder 41 shown in FIG. 6 are formed. Referring to FIG. 7, when the deep grooves are formed, the positions of the fitted optical fibers 43 are lower than those shown in FIG. 6.

In addition, when a fixing material for the optical fibers is brought into contact with the surface of the mounting jig, the mounting jig itself may be fixed. For this reason, an amount of fixing material must be kept proper, and when the fixing material is accidentally brought into contact with the mounting jig, a manufacturing apparatus must be stopped, and the mounting jig must be replaced and adjusted again.

The grooves are formed in the mounting holder by performing anisotropic etching on a surface having a predetermined crystal orientation. In this case, since this etching progresses along the crystal orientation, as shown in FIG. 8, when the angle of an etching mask 51 is shifted from a crystal orientation 52 of the mounding holder indicated by broken lines, the surface of the mounting holder is etched along the crystal orientation regardless of the opening of the etching mask 51. As a result, the width and positions of the grooves are shifted with respect to those of the etching mask.

On the other hand, although the mounting conditions of optical fibers in the same mounting holder are equal to each other by simultaneous mounting, the mounting conditions of a plurality of mounting holders are not necessarily equal to each other. The mounting conditions are slightly changed by an amount of adhesive or curing conditions during mounting, pressing conditions of a press plate, and the like. In general, an optical fiber often has a spare length of several tens cm. A method of holding the spare length of the optical fiber and the difference between the winding directions of optical fibers in manufacturing the optical fibers influence the variations in mounting conditions. When an optical fiber is fixed using a metal such as a solder, the thickness of the formed solder or the like and the thickness of a metal coat of the optical fiber may easily cause dispersion. Even when optical fibers are mounted on mounting holders which have almost identical processing states and the same pressing conditions, the deviation between the mounting holder is easily increased.

As described above, in the conventional mounting technique using a mechanical fitting operation, the positions of optical fibers in V-grooves have relative deviations in units of mounting holders, and the deviation between the mounting holders cannot be easily controlled to be several μm or less. These relative deviations do not much influence multi-mode fibers each having a large core diameter, but easily influence single-mode fibers because each single-mode fiber has a core diameter as small as about 10 μm and an allowable positional error which is strictly set to be 1 to 2 μm or less. That is, absolute positional adjustment for a mounting holder cannot be easily performed at a high precision by only a mechanical assembling process.

In optical coupling between an optical semiconductor device and an optical fiber or an optical waveguide, or in an optical semiconductor module such as a so-called IC card in which semiconductor integrated circuits are mounted on a portable substrate at a high density, an input/output coupling portion must be connected to another coupling body, e.g., an optical connector or a multi-pin connector, to have a position adjusted with respect to the coupling body at a high precision because of the following reason. That is, in the former case, i.e., in the optical coupling, when a single-mode optical fiber or optical waveguide is optically coupled to a semiconductor laser, a high positional precision is required; in the later case, i.e., in the optical semiconductor module, as the storage capacity of the IC card is larger, the number of connecting pins of the IC card is increased and the interval between the connecting pins is narrowed to set the size of each pin to be small. For example, in the coupling between an optical fiber and a semiconductor laser, a multi-mode optical fiber requires a precision of ±5 μm or less, and a single-mode optical fiber requires a precision of ±2 μm or less. In the IC card, the required precision is gradually strict, and a precision of ±10 μm or less at a pitch of 100 μm is considered in the future.

FIG. 9 shows an optical semiconductor module obtained according to a prior art devised to meet the above request (e.g., Japanese Patent Application No. 3-238038). A submount 76 constituted such that a silicon substrate 61 and a silicon substrate 63 are directly bonded to each other using an oxide film 62 as an adhering interface is tightly interposed between two guide pins 65 and mounted on a copper stem 69. A recessed portion having a depth reaching the depth of the adhering interface is formed in the submount 76 by etching, and a semiconductor chip 64 is soldered on the bottom surface of the recessed portion.

As shown in FIG. 10, the submount 76 arranged to be tightly interposed between the two guide pins 65 is positioned and fixed by a pressure such that a press plate 75 is fixed on the copper stem 69 by tightening screws in holes 74. That is, the position of the surface of the semiconductor chip 64 in a vertical direction is determined by the sum of the thicknesses of the semiconductor chip 64 and the silicon substrate 61. The position in a horizontal direction is determined by controlling the position of the submount 76 relative to the guide pins such that the width of the submount 76 cut by dicing or the like is set to be equal to the interval between the guide pins 65. In this case, the horizontal position of the semiconductor chip 64 is determined such that the above recessed portion is arranged at a predetermined position of the submount 76, thereby arbitrarily setting the position of the submount 76 with reference to the guide pins 65.

However, in the above prior art, a vertical force generated when the submount is positioned and fixed acts on the guide pins 65 and the copper stem 69, but a lateral force disadvantageously acts on contact points between the submount 76 and the guide pins 65. For this reason, a semiconductor chip or the like which is easily broken by an external force is difficult to be directly mounted between the guide pins. Even when a submount which is relatively strong against the external force is used, a force acting in the lateral direction may break the silicon substrate, and a cutting precision must be strictly controlled to properly set the lateral dimensions. Even if a submount is cut to have a properly controlled width because the cutting precision of dicing is high, the central position of the submount 76 is often shifted with respect to the cut ends of the submount. Therefore, difficulty in manufacturing a module, the stability of a mechanical position against a change in temperature, and the like pose problems.

As has been described above, a mass-production type optical semiconductor module which can be manufactured at a low cost using no optical axis adjustment but using a highly precise module substrate which can be precisely formed in mass production by the semiconductor process, temperature characteristics and optical coupling characteristics disadvantageously have poor reproducibility.

SUMMARY OF THE INVENTION

It is an object of the present invention to provide an optical semiconductor module which has a simple structure, can be connected to an external circuit at a high density, and has excellent productivity.

It is another object of the present invention to provide an optical semiconductor module which has excellent reproducibility of temperature characteristics and optical coupling characteristics, and, therefore, which can achieve an essentially great reduction in cost, and mass production.

It is still another object of the present invention to provide an optical semiconductor module in which an excessive external force does not act on a submount or a semiconductor chip interposed between guide pins during fixing the module, a positional relationship between a semiconductor chip and another semiconductor module constituent part in the semiconductor module can be kept at a high precision to two-dimensionally connect the semiconductor modules to each other.

It is still another object of the present invention to provide an optical fiber mounting body which performs absolute positional adjustment to a mounting holder at a high precision by only a mechanical assembling process, can increase productivity of various modules using optical fibers, and can facilitate a reduction in manufacturing cost and manufacturing of a module array.

It is still another object of the present invention to provide an optical fiber fixing apparatus which can perform absolute positional adjustment to a mounting holder at a high precision by only a mechanical assembling process, can increase productivity of various modules using optical fibers, and can facilitate a reduction in manufacturing cost and manufacturing of a module array.

It is still another object of the present invention to provide a method of fixing an optical fiber, which can perform absolute positional adjustment to a mounting holder at a high precision by only a mechanical assembling process, can increase productivity of various modules using optical fibers, and can facilitate a reduction in manufacturing cost and manufacturing of a module array.

According to the present invention, there is provided an optical semiconductor module comprising:

a submount body having a groove buried with an insulator;

an optical semiconductor device mounted on the submount body;

a cap member, arranged across the groove on the submount body and bonded and fixed to the submount body by a bonding member, for hermetically sealing the optical semiconductor device; and an electrical wiring layer arranged to extend from an outside of the cap member on the submount body to an inside of the cap member through the groove buried with the insulator, the electrical wiring layer being electrically connected to the optical semiconductor device.

According to the present invention, there is provided an optical semiconductor module comprising:

a semiconductor substrate having a first groove, buried with an insulator, for extending an electrical wiring layer therethrough and a second groove in which an optical fiber is to be mounted;

an optical semiconductor device mounted on the semiconductor substrate;

an optical fiber arranged in the second groove such that an optical axis of the optical fiber coincides with an optical axis of output light from the optical semiconductor device;

a cap member arranged across the first and second grooves on the semiconductor substrate and bonded and fixed to the semiconductor substrate by a bonding member, for hermetically sealing the optical semiconductor device and the optical fiber; and an electrical wiring layer arranged to extend from an outside of the cap member on the semiconductor substrate to an inside of the cap member through the groove buried with the insulator, the electrical wiring layer being electrically connected to the optical semiconductor device.

According to the present invention, there is provided an optical semiconductor module comprising:

a compound semiconductor substrate having a first groove, buried with an insulator, for extending an electrical wiring layer therethrough and a second groove in which an optical fiber is to be mounted;

an optical semiconductor device mounted on the compound semiconductor substrate;

a cap member arranged across the first groove on the compound semiconductor substrate and bonded and fixed to the compound semiconductor substrate by a bonding member, for hermetically sealing the optical semiconductor device;

an electrical wiring layer arranged to extend from an outside of the cap member on the compound semiconductor substrate to an inside of the cap member through the groove buried with the insulator, the electrical wiring layer being electrically connected to the optical semiconductor device;

a guide pin, arranged in the second groove, for connecting the optical semiconductor module to another optical semiconductor module; and a buffer member in contact with the guide pin and formed on the compound semiconductor substrate between the guide pin and the optical semiconductor device, wherein the compound semiconductor substrate includes a body constituted by directly bonding two semiconductor substrates having smooth surfaces, the second groove is formed by etching a region of the compound semiconductor substrate outside the cap member to reach a contact portion of the semiconductor substrates.

According to the present invention, there is provided an optical fiber mounting body comprising a mounting holder having a major surface in which a groove is formed and an optical fiber positioned and fixed in the groove of the mounting holder, wherein a plastic material is interposed between the optical fiber and the groove, and the optical fiber is not in direct contact with the mounting holder.

According to the present invention, there is provided an optical fiber fixing apparatus for pressing an optical fiber to position and fix the optical fiber in a groove of a mounting folder having a major surface in which the groove is formed, comprising: a first semiconductor substrate, and a second semiconductor substrate bonded to the first semiconductor substrate with an insulating film interposed therebetween, wherein the second semiconductor substrate has a thickness for positioning the optical fiber, part of the second semiconductor substrate is removed to expose the insulating film, and an exposed surface of the insulating film is a surface for pressing the optical fiber.

According to the present invention, there is provided a method of fixing an optical fiber, comprising the steps of:

arranging a plastic material in a groove of a mounting holder having a major surface in which the groove is formed;

heating the plastic material to a temperature lower than a melting point at which the plastic material can be deformed;

arranging the optical fiber in the groove; and pressing the optical fiber against an exposed surface of an insulating film so as not to bring the optical fiber into direct contact with a mounting holder while the plastic material present between the optical fiber and the groove is being deformed using an optical fiber fixing member comprising a first semiconductor substrate and a second semiconductor substrate bonded to the first semiconductor substrate with the insulating film interposed therebetween, the second semiconductor substrate having a thickness for positioning the optical fiber, and the second semiconductor substrate having part removed to expose the insulating film.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out in the appended claims.

BRIEF DESCRIPTION OF THE DRAWINGS

The accompanying drawings, which are incorporated in and constitute a part of the specification, illustrate presently preferred embodiments of the invention, and together with the general description given above and the detailed description of the preferred embodiments given below, serve to explain the principles of the invention.

FIGS. 5 and 6 are perspective and sectional views, respectively, showing the arrangement of a conventional optical semiconductor mounting body;

FIG. 7 is a sectional view showing the arrangement of a conventional optical fiber mounting body having grooves each of which is deeper than that of the optical fiber mounting body shown in FIG. 5;

FIG. 20 is a perspective view showing the schematic arrangement of an optical semiconductor module according to the seventh embodiment;

FIG. 21 is a perspective view showing the schematic arrangement of an optical semiconductor module according to the eighth embodiment;

FIGS. 22A and 22B are sectional views showing an optical coupling portion according to the eighth embodiment;

FIG. 26 is a sectional view showing a procedure of mounting an optical fiber on an optical fiber mounting holder when an optical fiber mounting holder has a groove deeper than that of the optical fiber mounting holder shown in FIG. 23;

FIG. 31 is a perspective view showing another modification of the tenth embodiment of the present invention;

FIG. 35 is a perspective view showing the schematic arrangement of a semiconductor module according to the twelfth embodiment;

FIGS. 39A and 39B are perspective and sectional views, respectively, showing the arrangement of a semiconductor module according to the fourteenth embodiment.

DETAILED DESCRIPTION OF THE PREFERRED EMBODIMENTS

Figure 1:
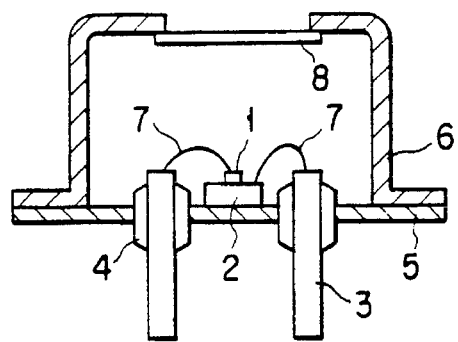
FIGS. 1 and 2 are views showing hermetic sealing packages of conventional optical semiconductor modules.
Figure 2:
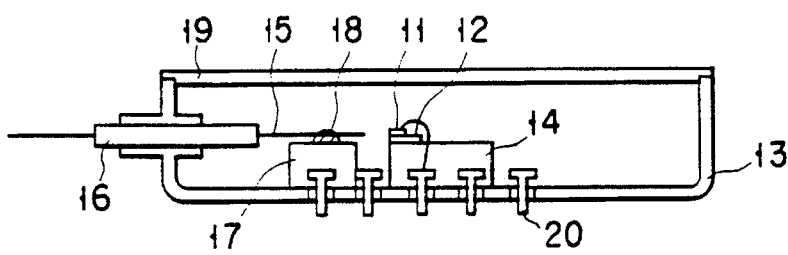
Figure 3A:
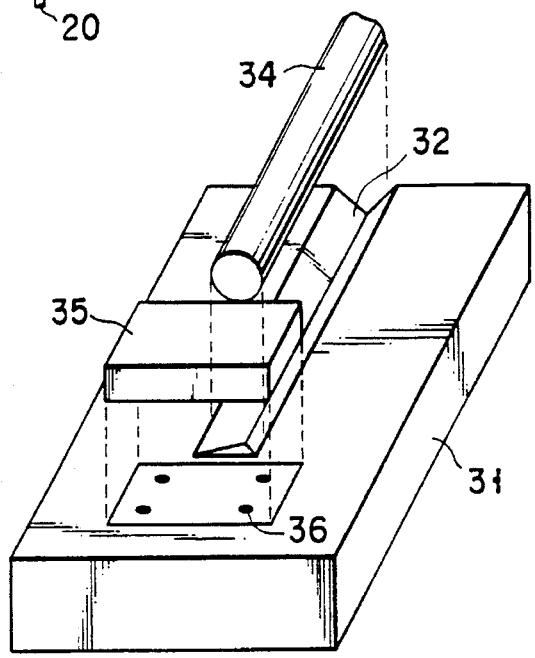
FIGS. 3A and 3B are perspective and sectional views, respectively, showing a conventional optical semiconductor module.
Figure 3B:
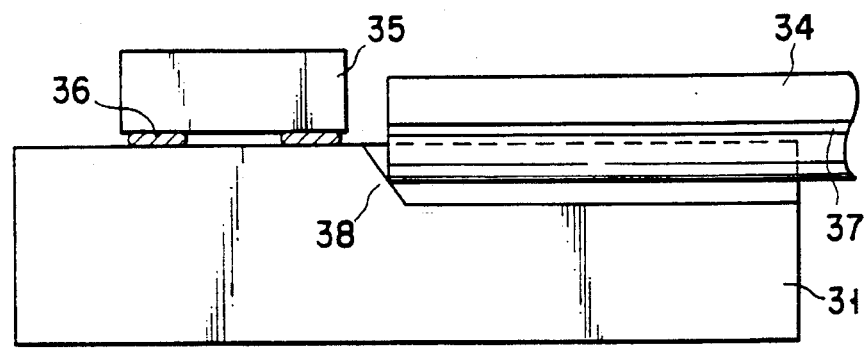
Figure 4A:
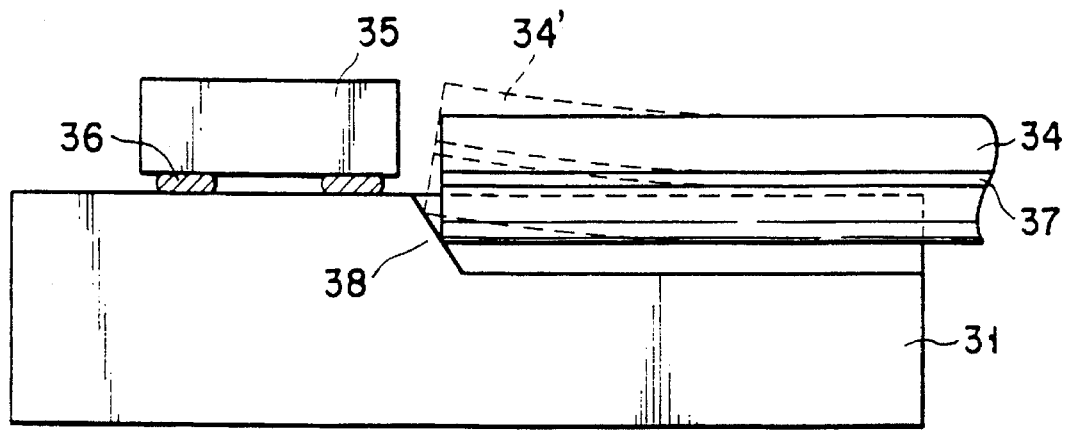
FIGS. 4A and 4B are views showing a state in which the optical axis of a conventional optical semiconductor module is decentered.
Figure 4B:
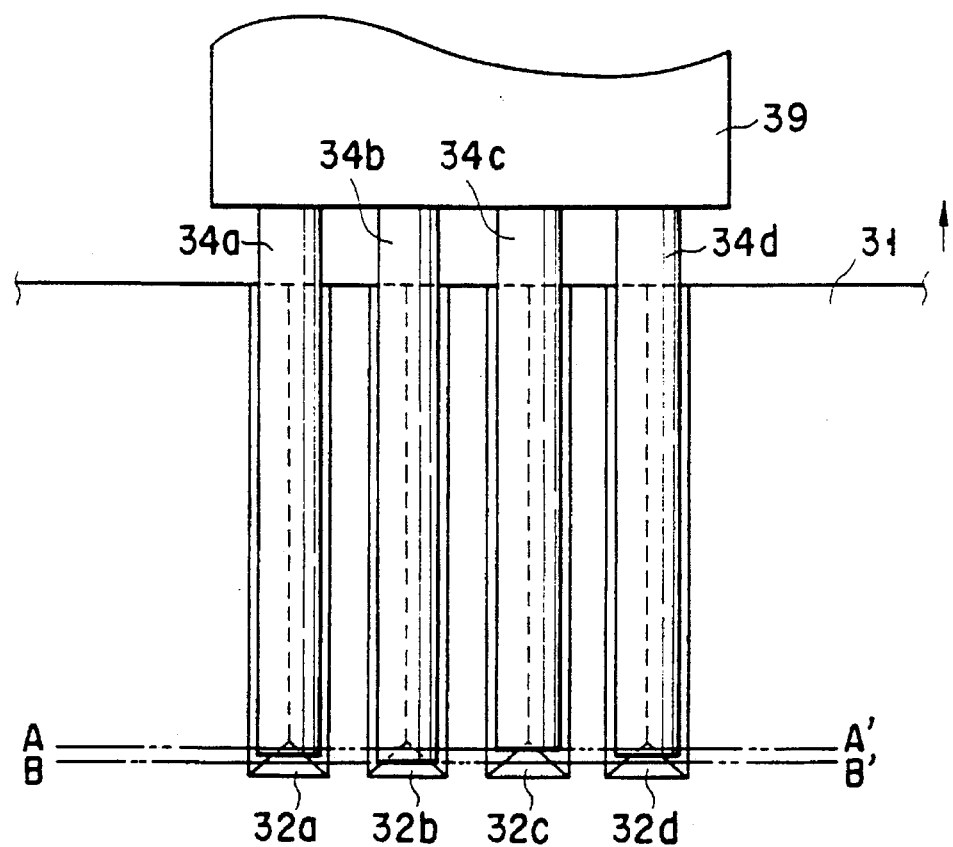
Figure 8:
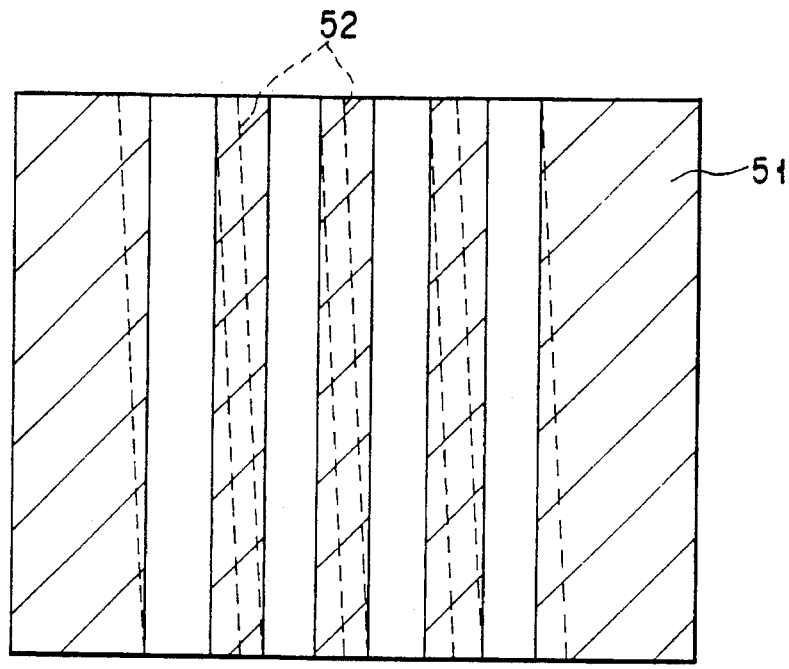
FIG. 8 is a view showing the shifts of the widths of grooves obtained when the direction of a mask is shifted from the orientation of a crystal face.
Figure 9:
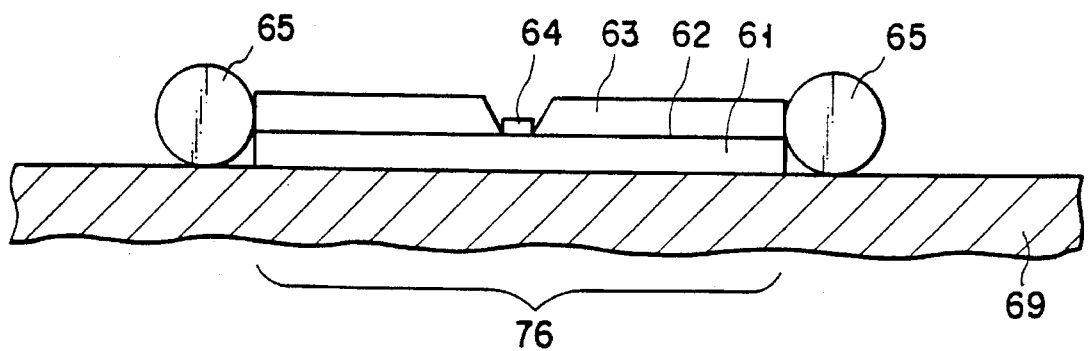
FIG. 9 is a view showing the arrangement of a main portion of a semiconductor module according to a prior art using an optical fiber mounting body and guide pins.
Figure 10:
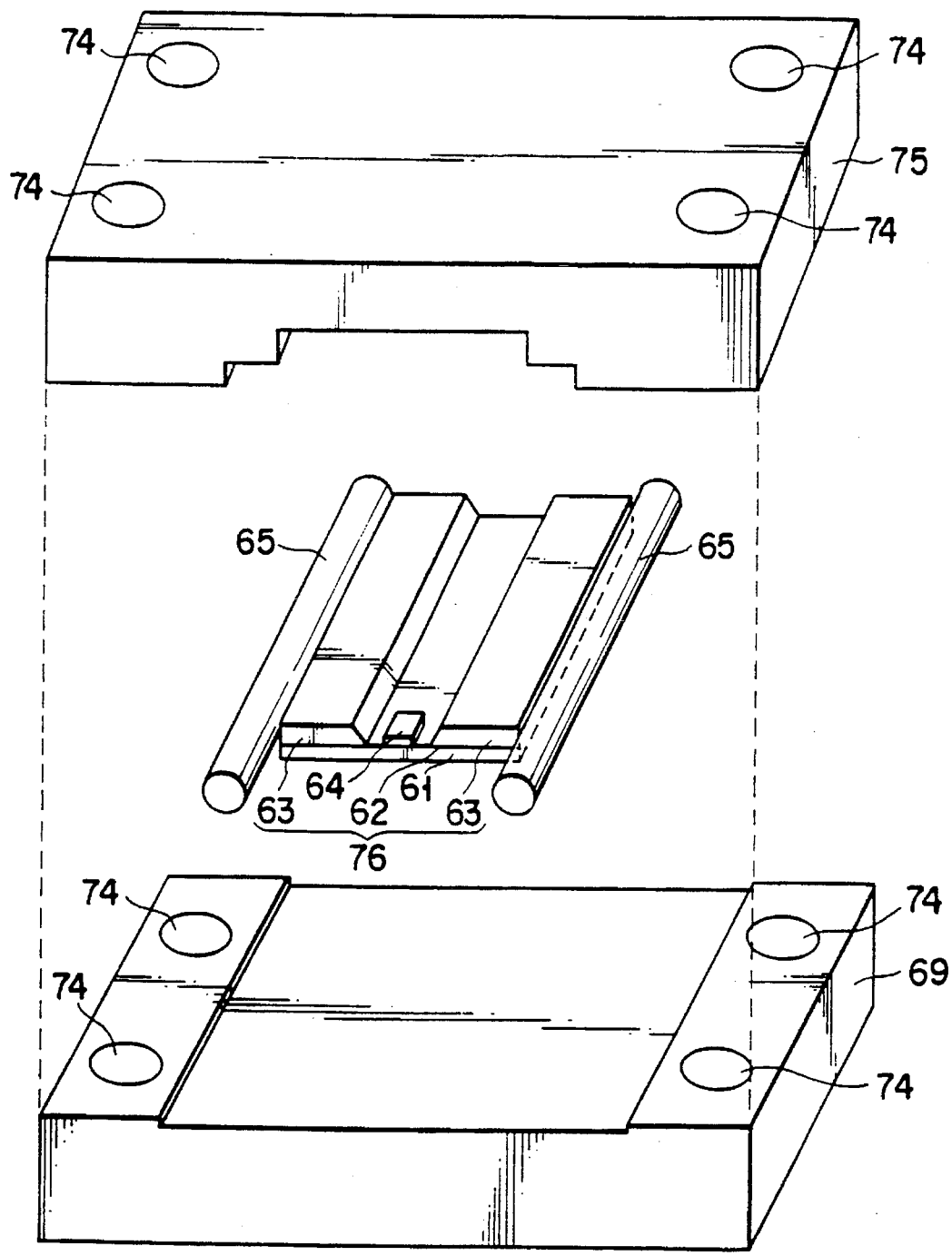
FIG. 10 is a view showing the overall arrangement of a semiconductor module according to the prior art using guide pins.

According to the first aspect of the present invention, a cap is directly soldered on an Si submount on which an optical semiconductor device is mounted, so that an optical semiconductor device, an optical coupling system, and an optical fiber can be hermetically sealed at once to have a size equal to that of the optical semiconductor device. For this reason, a fiber coupling type optical semiconductor module is hermetically sealed in a small region, and the fiber coupling type optical semiconductor module can be connected to an external circuit at a high density. In addition, the fiber coupling type optical semiconductor module can be connected to another electric circuit part without any special consideration, and the integration density is increased and at the same time productivity can be improved.

An optical semiconductor module according to the second aspect of the present invention does not require optical axis adjustment and can be manufactured by only a mechanical assembling process. Therefore, an automatic assembling process can be easily performed, and a great reduction in cost and mass production can be achieved. In addition, in the optical semiconductor module according to the present invention, the distal end of an optical fiber is rarely deformed, and positional adjustment can be performed with a large margin, thereby obtaining good reproducibility of optical coupling characteristics. Temperature stability can be improved because the optical axis is stable against a change in ambient temperature. Therefore, when a plurality of optical fibers are used, variations in characteristics of the optical fibers are small, and excellent temperature characteristics can be obtained.

According to the third aspect of the present invention, since the mounting positions of optical fibers can be defined by a mounting jig regardless of the groove processing precision of a mounting holder, the relative positional deviation between positions where optical fibers are mounted in mounting holders can be greatly reduced. Therefore, coupling between an optical semiconductor element or an optical waveguide and an optical fiber can be performed at a high precision by only mechanical positional adjustment, and a great reduction in cost of the modules and mass production of modules, requiring optical fiber coupling, such as optical transmission modules or optical switch modules for optical communication can be achieved.

According to the fourth aspect of the present invention, guide pins and a semiconductor chip are positioned in a planar direction by a relatively simple mask aligning process, and are arranged in the planar direction on the same flat surface exposed by selective etching so as to be in contact with each other, so that vertical positioning at a high precision in a module with reference to the flat surface can be performed. In addition, since the guide pins are in contact with only the bottom surface of a recessed portion or the bottom surface and at least one side surface, a force generated when the module is fixed acts on only the bottom surface of the recessed portion or the bottom surface and the side surface, and an excessive external force does not act on the submount or the semiconductor chip interposed between the guide pins.

The bottom surfaces of the recessed portions of semiconductor modules are arranged on almost the same plane by guide pins, and the guide pins and semiconductor chips mounted on the plurality of semiconductor modules connected to each other through the guide pins are arranged on almost the same plane. For this reason, when the semiconductor modules are connected to each other, these modules are easily positioned in a vertical direction. Since the present invention has the above characteristic feature, even when a plurality of semiconductor modules described above are connected to each other through guide pins, a semiconductor module having a high positioning precision with other semiconductor module constituent parts can be provided.

In addition, since the recessed portions of guide pins can be two-dimensionally arranged in all directions, semiconductor modules can be two-dimensionally connected to each other, and the bottom surfaces of the semiconductor chips and the guide pins are arranged on the same plane.

Figure 11A:
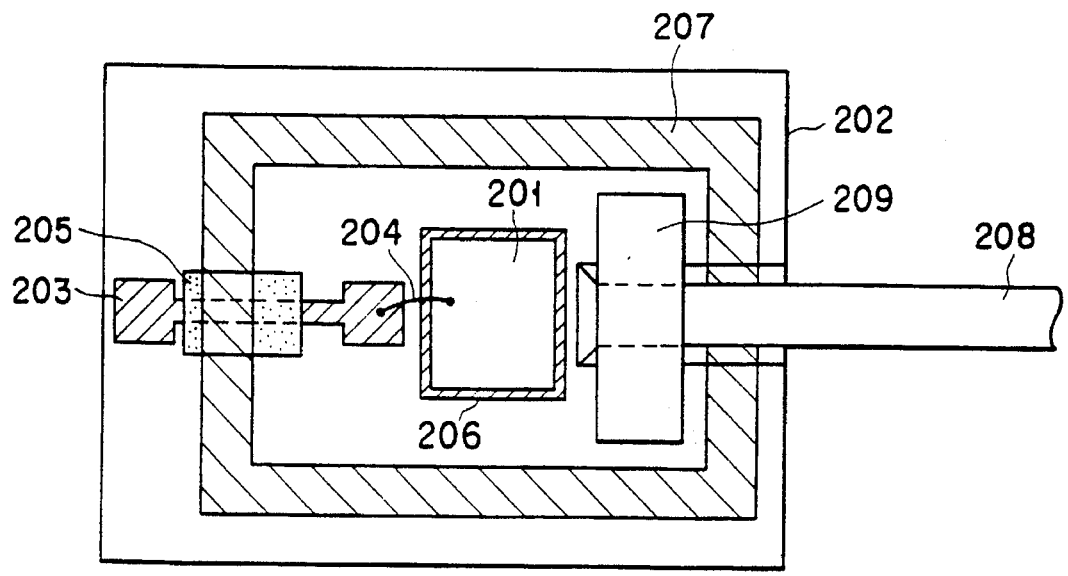
FIGS. 11A and 11B are plan and sectional views, respectively, showing the schematic arrangement of an optical semiconductor module according to the first embodiment.
Figure 11B:
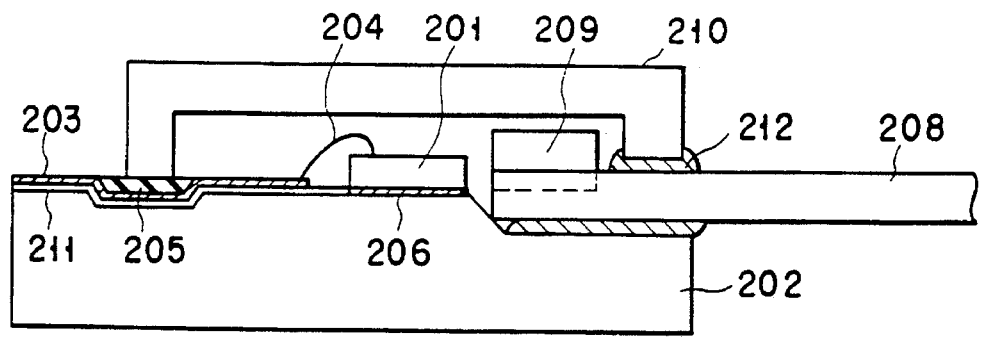

FIG. 11A is a plan view showing the schematic arrangement of an optical semiconductor module according to the first embodiment of the present invention, and FIG. 11B is a side sectional view showing the optical semiconductor module in FIG. 11A. FIG. 11A shows the state of an arrangement obtained before an hermetically sealing cap is mounted.

Referring to FIG. 11A, reference numeral 201 denotes an optical semiconductor device e.g., a semiconductor laser and mounted on an Si substrate (Si submount) 202. In general, in an optical semiconductor device, since heat generation is concentrated on a small region, heat dissipation comes into question. For this reason, good heat dissipation characteristics are preferable, and Si having a thermal expansion coefficient closer to that of an optical semiconductor device than that of a metal or ceramic is often used as the material of a submount. In addition, Si substrate can be mass-produced using the semiconductor device manufacturing process, can be processed at a high precision, and has a mechanical strength higher than that of compounded semiconductor materials such as gallium arsenide. A process of forming an electrical wiring layer or an oxide film is established, and the use of Si as the material of a submount has many merits.

An electrical wiring layer 203 is formed on the Si submount 202 and electrically connected to the optical semiconductor device 201 with a bonding wire 204. Reference numeral 205 denotes an insulator which is filled in the recessed portion of the Si submount 202 and has a surface flattened by a process (to be described later); 206, a ground electrode of the optical semiconductor device 201; 207, a solder (sealing solder) for fixing a hermetic sealing cap; 208, an optical fiber; and 209, a holder (fiber folder) for fixing the optical fiber 208. The optical fiber 208 is fixed in a V-groove formed in the Si submount 202.

In this case, the electrical wiring layer 203 is electrically connected through the inner surface of the recessed portion of the Si submount 202, and at this portion, the insulator 205 is formed on the electrical wiring layer 203. For this reason, the electrical wiring layer 203 is electrically insulated from the sealing solder 207. In addition, when the thickness of the insulator 205 is sufficiently large, degradation of the RF transmission characteristics of the electrical wiring layer 203 can be suppressed. The insulator 205 preferably has a thickness of several tens μm to decrease the parasitic capacitance generated between the insulator 205 and the sealing solder 207. For this reason, a fluid material such as low-melting glass is advantageously used as the insulator 205, and the fluid material is hardened on the Si submount 202. This will be described later.

with the above arrangement, a hermetic sealing structure for the optical semiconductor device 201 can be greatly decreased in size, and the bandwidth of several GHz or more can be assured as the RF transmission characteristics of the electrical wiring layer 203 even when the hermetic sealing cap is mounted on the Si substrate. In addition, according to the characteristic feature of this embodiment, since the insulator 205 for hermetically sealing the electrical wiring layer is locally buried in the Si substrate, a low stress acts on the insulator 205, and cracks and breaks do not easily occur in the insulator 205.

This can be easily understood by considering a case wherein the insulator 205 is formed not to be buried. More specifically, as a relatively general hermetic sealing method, the sealing solder 207 is formed on an insulator formed in the same form as that of the sealing solder 207, and a flat electrical wiring layer is formed under the insulator. In this case, the thermal expansion characteristics of the insulating material and the substrate material (Si) must be sufficiently considered, and the difference between the thermal expansion characteristics of the materials causes cracks or breaks easily in the insulator due to the following influence. That is, the absolute size of the insulator is increased, and, since the portion with which the insulator is in contact is on the same plane as that of the Si substrate, warpage of this plane directly acts on the insulator to easily cause cracks in the insulator.

In contrast to this, according to the present invention, the insulator 205 is formed in only a minimum region for burying the electrical metal wiring layer to have a small size, and the insulator is formed to be buried. For this reason, the insulator is in contact with not only one flat surface of the substrate but also a side surface of the substrate, the insulator is protected from stress deformation by the Si submount 202, and microscopic deformation (e.g., warpage) of the Si substrate 202 does not easily influence an insulator buried portion which is a small region, thereby obtaining the above characteristic feature.

FIG. 11B is a sectional view showing a schematic structure according to this embodiment, and shows a state wherein a cap 210 is arranged after the state shown in FIG. 11A is obtained. In this case, since a groove formed in the Si submount 202 does not easily have a semicylindrical shape, a fixing portion of the optical fiber 208 often has a gap. For this reason, in an example shown in FIG. 11B, an auxiliary sealing solder 212 for filling this gap is used. This auxiliary sealing solder 212 can be formed by melting a solder having a relatively low melting point and injecting the solder into the gap using a capillary phenomenon.

Figure 12A:
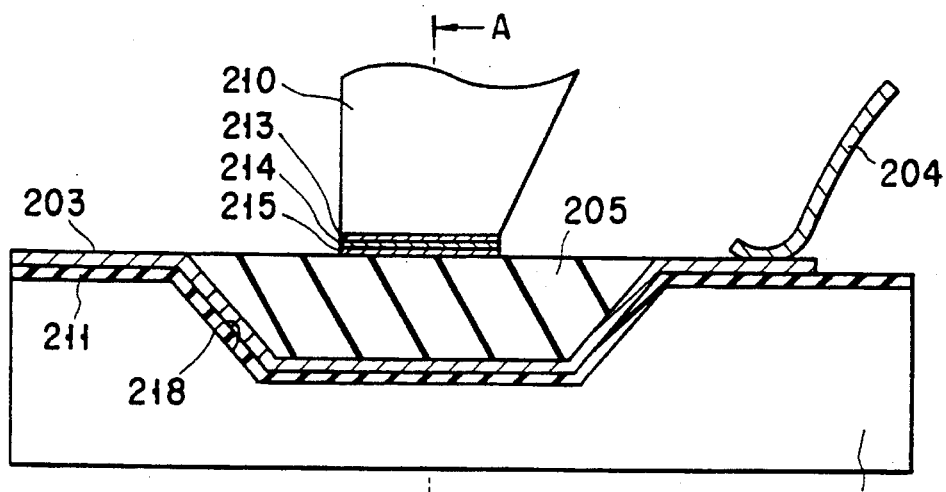
FIGS. 12A and 12B are enlarged sectional views showing a portion in which an electrical wiring layer is buried according to the first embodiment.
Figure 12B:
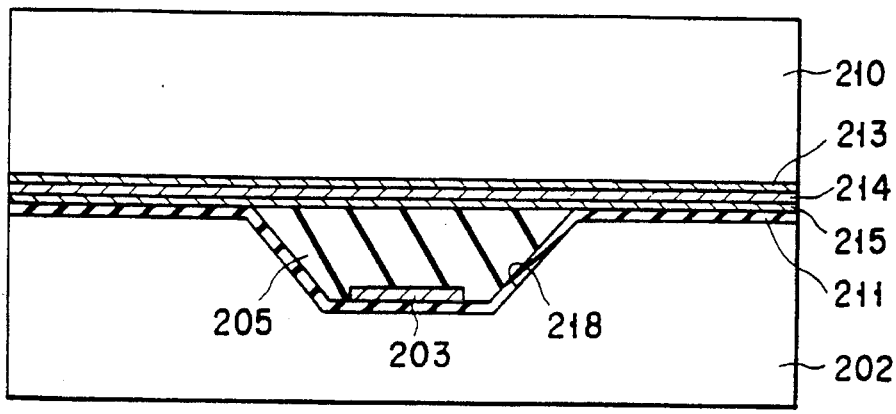

A burying portion of the electrical wiring layer 203 can be arranged as shown in FIGS. 12A and 12B. FIG. 12A is an enlarged view showing a burying/sealing portion of the electrical wiring layer 203. Reference numeral 213 denotes a metal for metallizing the cap 210, i.e., Au/Pt/Ti using Ti as an underlayer; 214, a sealing solder; and 215, a metallizing metal layer, on the Si submount side, consisting of, i.e., At/Pt/Ti like the metal 214. Annealing at about 300° C. is performed using, e.g., an eutectic solder of AuSn as the sealing solder 214 to fix the Si submount 202 to the cap 210.

Referring to FIG. 12A, although the sealing solder 207 is formed on the Si submount side, the sealing solder 207 may be formed on the cap 210 side. That is, if the same arrangement as that shown in FIG. 12A is obtained as the final arrangement, the solder 207 may be formed on either the Si submount side or the cap 210 side. FIG. 12B is a sectional view along a line A—A' in FIG. 12A. The insulator 205 is a burying portion for obtaining hermetic sealing and must have a flat surface having a level almost equal to the surface of the Si sub mount 202. When this portion is extremely shifted from the flat surface, the sealing solder 214 cannot preferably perform hermetic sealing.

A method of burying the insulator 205 flat will be described below. FIGS. 13A to 13D are sectional views showing the steps showing a method of burying the electrical wiring layer 203 and correspond to FIG. 12B.

Figure 13A:
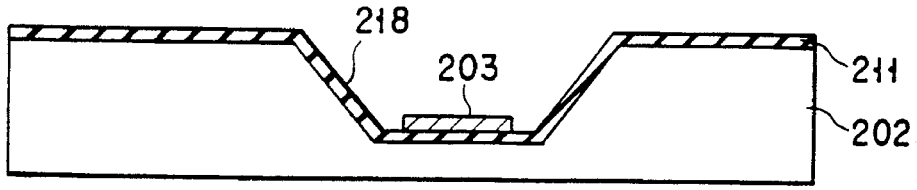
FIGS. 13A to 13D are sectional views showing the steps of burying an electrical wiring layer according to the first embodiment.

As shown in FIG. 13A, an etching mask such as an $SiO_2$ film or an $Si_3N_4$ film is formed by photolithography on the Si substrate 202 having the (100) plane, and the Si substrate 202 is anisotropically etched. In this etching, a KOH aqueous solution, hydrazine, or the like is preferably used as an etchant to form an inverted trapezoidal groove 218 as shown in FIG. 13A. Thereafter, an $SiO_2$ film is formed by thermal oxidation processing, or an $Si_3N_4$ film is formed by a chemical vapor deposition method, and either film is used as an insulating film 211 on the surface of the Si substrate. At this time, since the insulating film 211 may be constituted by a single-layered film or a multilayered film, the etching mask may be left/removed on/from the Si substrate. However, the insulating film 211 is formed to include at least one $Si_3N_4$ film.

The electrical wiring layer 203 is formed by a lift-off method or a method of depositing a film and etching the deposited film. As the material of the electrical wiring layer, for example, a Ti/Pt/Ti multilayered film having an arrangement using a Ti, Cr, Cu, or Al film as a surface layer is used to be preferably in tight contact with the insulating film 211 consisting of $SiO_2$ and $Si_3N_4$ or to be preferably in tight contact with the insulator 205 (to be formed later). At this time, since the etching mask described above has an overhang at the peripheral portion of the groove, when the electrical wiring layer is formed after the overhang is removed, a trouble such as disconnection of the wiring layer can be prevented. In addition, when the surface of the electrical wiring layer 203 is coated with $Si_3N_4$, the wiring metal can be protected from damage in the step of flattening the insulator 205 (to be described later).

Figure 13B:
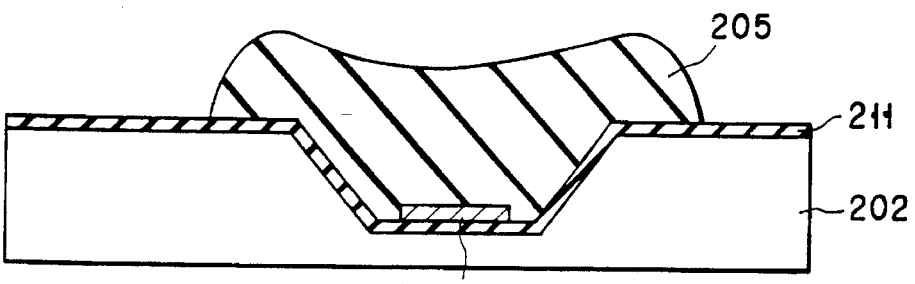

As shown in FIG. 13B, a low-temperature-melting glass paste formed with a solvent is coated as the insulator 205 on the resultant structure, and the glass is hardened by annealing. At this time, in order to prevent unnecessary glass from being bonded to a groove for holding an optical fiber, the glass coating is performed after a portion on which the glass should not be coated is coated with a tape, a metal mask, or the like.

Figure 13C:
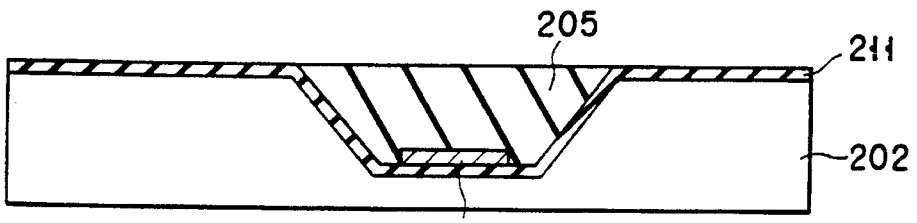

As shown in FIG. 13C, the glass sufficiently hardened by the thermal processing is removed by selective polishing to flatten the surface of the glass layer. As an example of this polishing method, flat polishing is gradually performed using a fine powder of aluminum oxide ($Al_2O_3$) as a polishing material until the glass is flattened. At this time, since aluminum oxide has a hardness higher than that of normal low-temperature-melting glass, aluminum oxide polishes the glass. However, since the aluminum oxide has a hardness lower than the $Si_3N_4$ described above, polishing is automatically stopped on the surface of the $Si_3N_4$ by appropriately controlling pressure application and the particle size of the polishing material during the polishing.

Figure 13D:
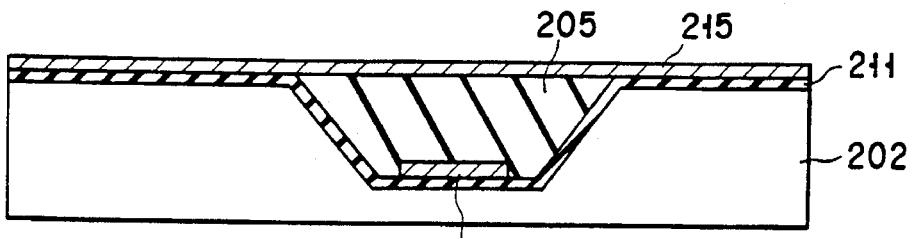

As shown in FIG. 13D, after the step of selectively polishing the surface, the metallizing metal layer 215 is formed, and an opening of electrical connecting region and a pad metal (e.g., Au/Pt/Ti) are formed at the flat portion of the Si substrate of the electrical wiring layer 203, thereby completing the step of burying the electrical wiring layer. In this case, a crushed layer whose mechanical hardness is decreased in the step of polishing the glass is often formed on the surface of the glass serving as the insulator 205. Annealing which does not adversely affect the electrical wiring metal 203 may be performed immediately after the step of polishing the glass, or an SiO$_2$ film, an Si$_3$N$_4$ film, or the like for reinforcing the surface of the glass may be formed on the glass.

Figure 14A:
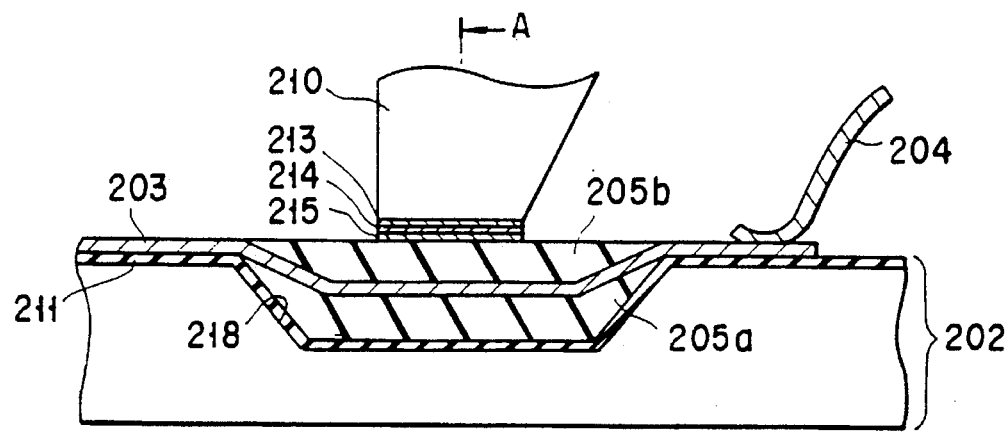
FIGS. 14A to 14B are enlarged sectional views showing a portion in which an electrical wiring layer buried and sealed in an optical semiconductor module according to the second embodiment.
Figure 14B:
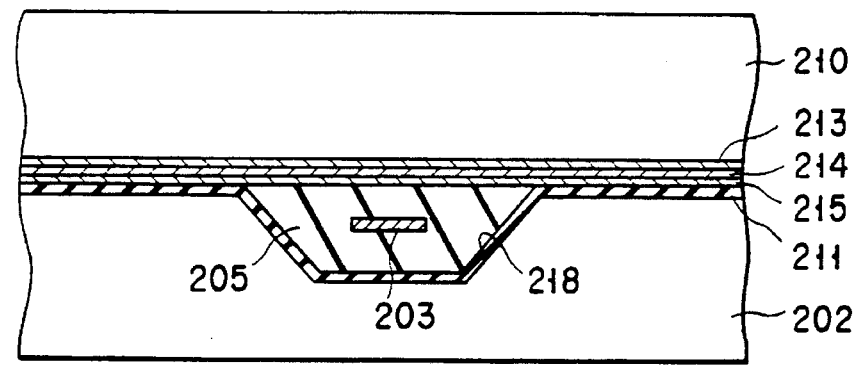

FIGS. 14A and 14B are enlarged sectional views showing a portion in which an electrical wiring layer is buried in an optical semiconductor module according to the second embodiment of the present invention. Note that the same reference numerals as in FIG. 12 denote the same parts in FIGS. 14A and 14B, and a detailed description thereof will be omitted.

This embodiment is different from the first embodiment in that an electrical wiring layer 203 in a groove portion is not buried in the bottom portion of the groove portion, but buried to the middle of the groove portion. That is, after an insulator 205a is buried to the middle of a groove 218 formed in an Si substrate 202, the electrical wiring layer 203 is arranged, and an insulator 205b is formed on the electrical wiring layer 203 to flatten the surface.

Figure 15A:
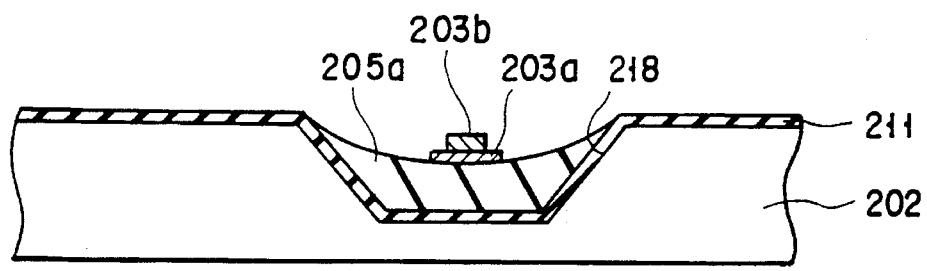
FIGS. 15A to 15D are sectional views the steps of burying an electrical wiring layer according to the second embodiment.
Figure 15B:
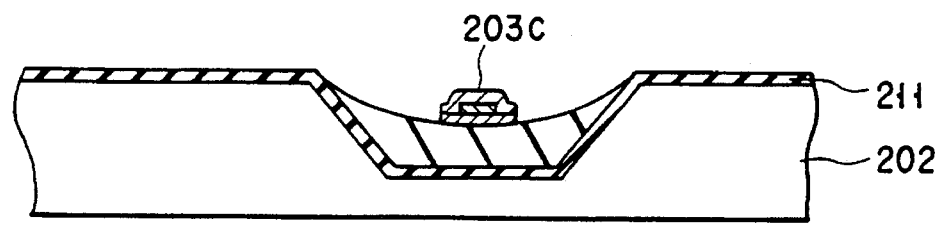
Figure 15C:
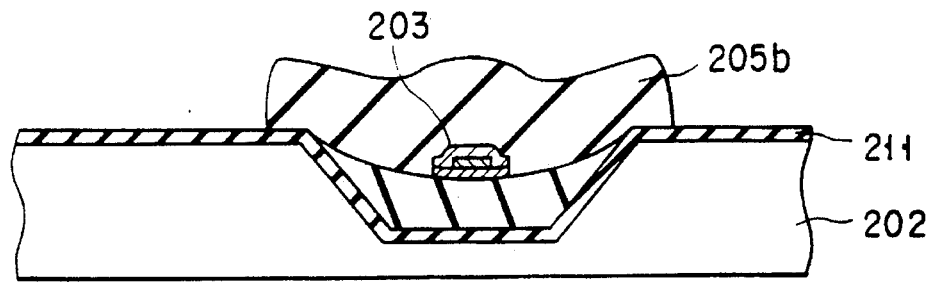

FIG. 15A to 15C are sectional views showing the steps in manufacturing the arrangement shown in FIGS. 14A and 14B. The steps are basically the same as those shown in FIGS. 13A to 13C except that an insulator 205 is buried twice. The electrical wiring layer 203 is constituted by three layers in this example to obtain preferable adhering characteristics between the electrical wiring layer 203 and the insulator 205. That is, as shown in FIG. 15A, after the insulator 205a is formed, a wiring layer 203b consisting of a highly conductive material is formed with an underlying metal layer 203a, which can be preferably bonded to the insulator 205a and an insulating film 211, interposed therebetween. Since the electrical wiring layer 203 is directly formed on the insulating film 211 outside the groove 218, the underlying metal layer 203a must consist of a material which can be preferably bonded to the insulating film 211.

As shown in FIG. 15B, a metal layer 203c consisting of the same metal as that of the underlying metal layer 203a is formed again. At this time, in order to preferably adhere the insulator 205 to the electrical wiring layer 203, the wiring layer 203b is desirably surrounded by the metal layers 203a and 203c. Therefore, referring to FIG. 15B, the width of the wiring layer 203b is set to be smaller than that of the metal layer 203a, and the wiring layer 203b is buried with the metal layer 203c.

Figure 15D:
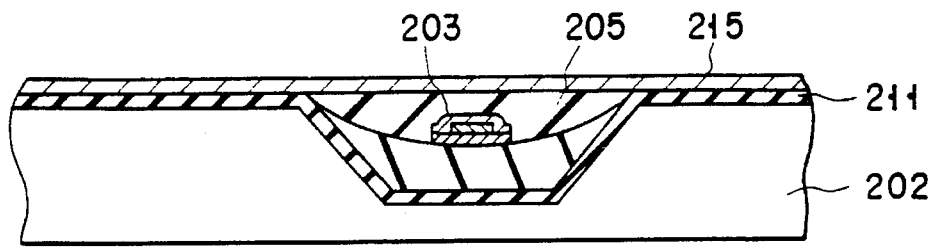

As shown in FIG. 15C, the insulator 205b is deposited. At this time, the insulator 205b may have an uneven surface. In this case, an unnecessary portion is removed by polishing, etching, or the like until the surface of the insulator 205b is flattened with respect to the surface of the Si substrate 202 as shown in FIG. 15D. When a crushed layer or the like is formed on the surface of the insulator 205b in polishing the surface of the insulator 205, polishing is stopped immediately before the surface is flattened, and the remaining unnecessary portion may be removed by etching. In addition, when a film having a wear resistance higher than that of the insulator 205b is used as the insulating film 211, i.e., when the insulating film 211 consists of glass, a silicon nitride film functions as a abrasion stopper used for polishing the insulator. For this reason, the insulator 205b can be almost flattened at the level of the insulating film 211. Thereafter, an underlying metal layer 215 serving as a sealing solder is formed.

when the insulating film 211 has a sufficiently large thickness and a high breakdown voltage, and a signal wiring layer has a small stray capacitance and preferable RF characteristics, as shown in FIGS. 13A to 13D, the electrical wiring layer 203 can be formed on the insulating film 211, and the groove 218 can be buried with the insulator 205. With this arrangement, the insulator 205 must be thick enough to bury the groove 218 formed in the Si submount 202.

Since the insulating film 211 must have a thickness such that the parasitic capacitance of the electrical wiring layer 203 is sufficiently smaller with respect to the frequency of a signal, when the frequency is high, the insulating film 211 must have a certain thickness. For example, the simplest estimation is as follows. Assume that the Si submount 202 is a high-resistance substrate, and that the parasitic capacitance between the Si submount 202 and the electrical wiring layer 203 is equal to the capacitance between the Si submount 202 and the metal layer 215 for solder sealing. Assume that the metal layer 215 for solder sealing and the electrical wiring layer 203 are parallel plates, that the area of a portion where the metal layer 215 crosses the electrical wiring layer 203 through the insulator 205 is 50×100 μm$^2$, and that SiO$_2$ is used as the insulator 205 and has a dielectric constant of 4.5. In this case, when the thickness of the insulating film 211 is about 2.5 μm, the parasitic capacitance is about 1 pF which corresponds to the band of about 3 GHz for a 50-Ω load. Since an actual capacitance is larger than this value due to an influence of an edge portion, when a signal line having a higher speed is required, the required thickness is larger than that represented by the value. Therefore, since a very long period of time is required to bury the groove with an insulator using a CVD apparatus or the like, this method is not practical.

Therefore, it is effective to use low-temperature-melting glass as an insulating material. The low-temperature-melting glass can be certainly uniformly deposited to be thick by a method such as spin coating or printing, and the low-temperature-melting glass can be patterned by a method such as photolithography. For this reason, the low-temperature-melting glass is an appropriate material for burying a groove.

As described above, an optical semiconductor module is used in a transceiver of a communication or information processing system, a fiber coupling type system in which the optical semiconductor module is coupled to an optical fiber is generally used. When the optical semiconductor module is coupled to the optical fiber, the optical coupling efficiency between the optical fiber and the optical semiconductor module must be considered. In general, the optical coupling efficiency is frequently increased such that the optical fiber is brought close to the optical semiconductor device. For this reason, the optical fiber is arranged to be closer to the optical semiconductor module in consideration of the optical coupling efficiency between the optical semiconductor module and the optical fiber, and the optical semiconductor device and the optical fiber are hermetically sealed at once. This structure will be described below.

Figure 16A:
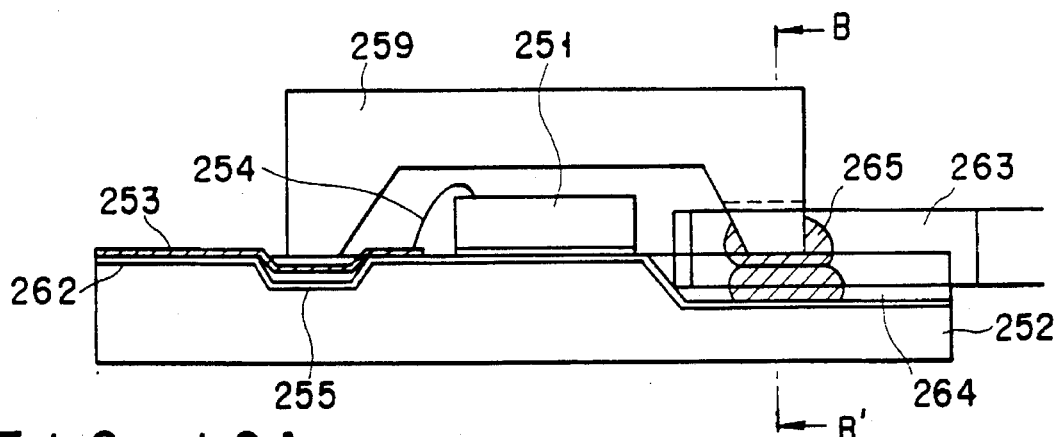
FIGS. 16A and 16B are sectional views showing the schematic arrangement of an optical semiconductor module according to the third embodiment.
Figure 16B:
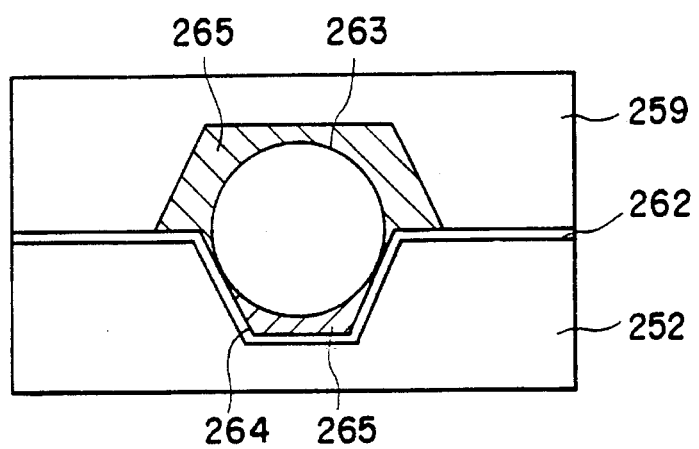

FIG. 16A is a side sectional view showing the schematic arrangement of an optical semiconductor module according to the third embodiment of the present invention, and FIG. 16B is a sectional view showing the optical semiconductor module along a line B—B' in FIG. 16A. Referring to FIG. 16A, reference numeral 251 denotes an optical semiconductor device which is mounted on an Si submount 252. An electrical wiring layer 253 is formed on the Si submount 252, and the electrical wiring layer 253 is electrically connected to the optical semiconductor device 251 with a bonding wire 254. Reference numeral 255 denotes a groove portion formed in the Si submount 252 and having the same structure as that shown in FIGS. 14A and 14B. Reference numeral 259 denotes a cap which is bonded to the Si submount 252 with a sealing solder material through an underlying metal layer for solder sealing. Reference numeral 262 denotes an insulating film formed for insulating the Si submount 252 from the electrical wiring layer.

Reference numeral 263 denotes a metal-coated optical fiber 263 which is held by a groove 264 formed in the Si submount 252 and is fixed on,the Si submount 252 by a solder 265 formed in the groove 264. The optical semiconductor device 251 is mounted such that the optical path of output light from the optical semiconductor device 251 is adjusted to coincide with the optical axis of the optical fiber 263.

FIG. 16B is a sectional view showing the optical semiconductor module along a line B—B' in FIG. 16A. The metal-coated optical fiber 263 and the groove 264 for holding the optical fiber are buried with the solder 265 in a sufficient amount at the boundary portion between the cap and the submount, thereby obtaining a hermetic sealing structure.

According to the optical semiconductor module, a cap is directly arranged on a small Si submount on which an optical semiconductor device, an optical fiber, and an optical coupling system are mounted, so that the optical semiconductor device, the optical fiber, and the optical coupling system can be hermetically sealed at once. A high optical fiber coupling efficiency can be obtained, the optical semiconductor module can be connected to an external circuit at a high density, and the optical semiconductor module can be connected to the external circuit without any special consideration.

In this case, the material of the cap may be either a metal or a semiconductor which can keep the cap hermetic by solder sealing. When a metal is used, the sealed semiconductor device can be externally, electromagnetically sealed by grounding a part of the cap. In addition, when a semiconductor material is used, the same effect as described above can be obtained by metallizing the surface of the semiconductor. When this effect is utilized, an electromagnetic interaction caused by mounting semiconductor chips at a high density is reduced, so that mounting at a higher density can be obtained. Since a conductive portion such as the bonding wire is often exposed inside the cap, it is preferable to electrically insulate the inner surface of the cap.

When the cap is to be formed of a semiconductor, the cap is advantageously formed of Si compared with a case wherein the cap is formed of a metal or the like because the cap can be formed of the same material as that of the Si submount. Only when Si is used, caps can be mass-produced by a process of simultaneously producing Si submounts, and productivity of the caps can be improved.

However, when Si is used, especially, when a cap is formed by the process of simultaneously producing an Si submount, the following problem is posed. Since the etching shape of the cap extends in a very large area, etching using anisotropy cannot be easily stopped unlike in a V-groove. For example, when a semiconductor laser is used as an optical semiconductor device, the shape of the device chip extends in an area having a several hundreds μm². Therefore, the area of an etched opening of the cap must be larger than that of the several hundreds μm², and an Si wafer must have a thickness on the order of mm to form the cap by a V-groove.

Therefore, etching must be completed immediately before the etching using an anisotropy is stopped to control the depth of the cap by controlling an etching time. However, in this case, the depth of etching considerably depends on etching conditions, and more particularly, conditions, which cannot be controlled, such as the uniform distribution of an etchant. In addition, the bottom surface of the etched opening may not be kept flat. An embodiment for solving the above problem will be described below.

Figure 17:
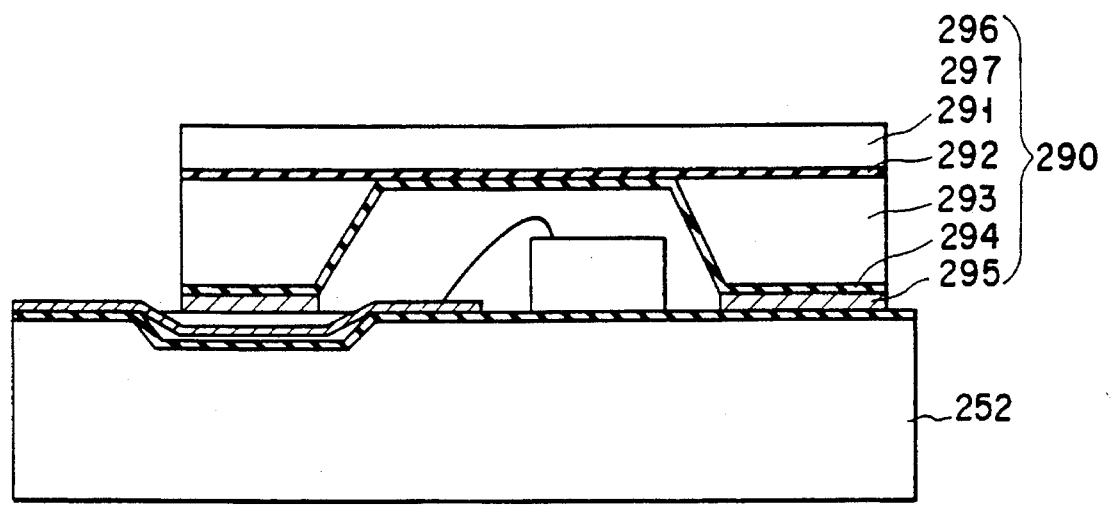
FIG. 17 is a sectional view showing the schematic arrangement of an optical semiconductor module according to the fourth embodiment.

FIG. 17 is a sectional view showing the schematic arrangement of an optical semiconductor module according to the fourth embodiment of the present invention. Reference numeral 290 denotes a cap. Other parts in FIG. 17 have the same arrangement as in FIGS. 16A to 16B. Reference numeral 291 denotes an Si substrate which is directly bonded to another Si substrate 293 to interpose an oxide film 292. A groove portion 296 formed by etching is formed in the Si substrate 293. Reference numeral 294 denotes an oxide film for insulating the cap from the electrical wiring layer in the cap. Reference numeral 295 denotes a solder metal layer and an underlying metal layer used for sealing the cap by a solder.

In this case, when an etching method having the etching rate of Si higher than the etching rate of an oxide film is used, a bottom surface 297 of a groove can be made into a flat surface. For this reason, when the cap 290 shown in FIG. 17 is used, the depth of the groove can be precisely controlled in accordance with the size of a device mounted inside the cap. In addition, caps can be mass-produced using a process preferably matched with the semiconductor process used for forming Si submounts. Therefore, since other small caps need not be prepared, a manufacturing line can be simplified, and productivity is improved.

In the above embodiment, an example wherein only an optical semiconductor device and an optical fiber are mounted on one Si submount has been described. However, an optical semiconductor device and an optical coupling system such as a lens can be mounted on one Si submount.

Figure 18A:
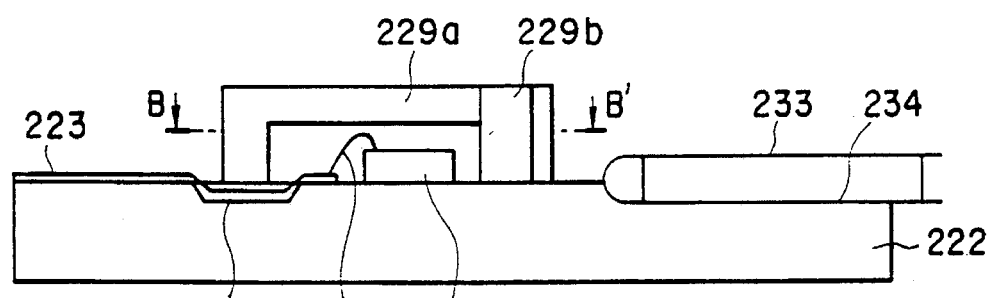
FIGS. 18A and 18B are sectional views showing the schematic arrangement of an optical semiconductor module according to the fifth embodiment.
Figure 18B:
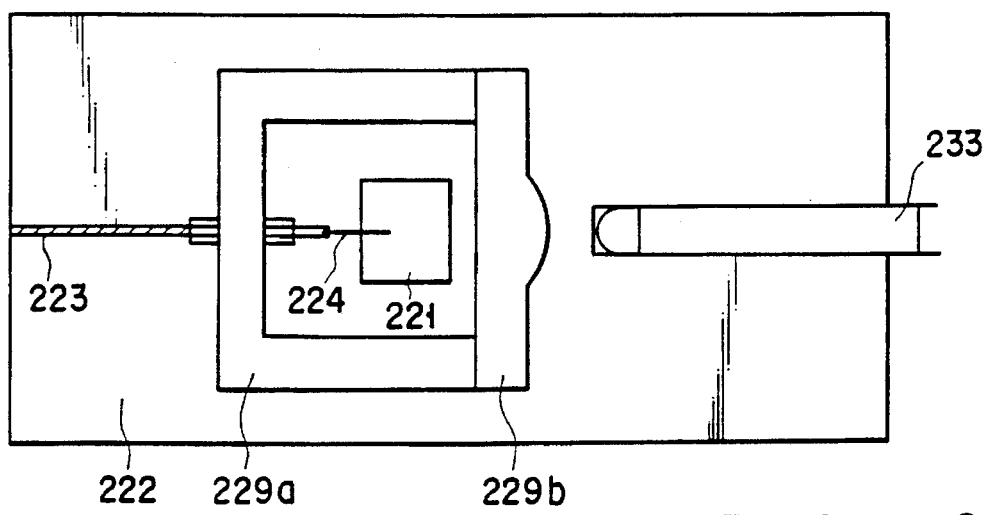

FIG. 18A is a side sectional view showing an optical semiconductor module according to the fifth embodiment of the present invention, and FIG. 18B is a sectional view showing the optical semiconductor module along a line B—B' in FIG. 18A. Referring to FIGS. 18A and 18B, reference numeral 221 denotes an optical semiconductor device which is mounted on an Si submount 222. An electrical wiring layer 223 is formed on the Si submount 222, and the wiring layer 223 is electrically connected to the optical semiconductor device 221 with a bonding wire 224. Reference numeral 225 denotes a groove portion formed in the Si submount 222 and having the same structure as that shown in FIGS. 14A and 14B. Reference numeral 233 denotes a metal-coated optical fiber which is fixed by soldering in a groove 234 formed in the Si submount 222. The optical semiconductor device 221 is mounted such that the optical path of output light from the optical semiconductor device 221 is adjusted to coincide with the optical axis of the optical fiber 233.

Reference numeral 229 denotes a cap which is bonded to the Si submount 222 by soldering and constituted by a box-shaped portion 229a and a lens-like transparent body 229b. The box-shaped portion 229a consists of a metal, a semiconductor, or ceramic, and the lens-like transparent body 229b consists of a material transparent to input/output light and has a lens-like structure to obtain optical coupling between the optical semiconductor device 221 and the optical fiber 233. For example, when the optical semiconductor device 221 is a semiconductor laser device, since output light is diffused, the lens-like transparent body 229b has a convex-lens structure to effectively couple the output light to the optical fiber. The box-shaped portion 229a and the lens-like transparent body 229b are hermetically bonded to each other by soldering or the like to constitute one cap 229.

According to this optical semiconductor module, an optical semiconductor device, an optical fiber, and an optical coupling system are mounted on the same Si submount, and a cap having a lens structure is directly arranged on the Si submount, so that the optical semiconductor device can be hermetically sealed in a small region. Therefore, an optical fiber coupling efficiency can be increased, and the optical semiconductor module can be connected to an external circuit at a high density.

Figure 19A:
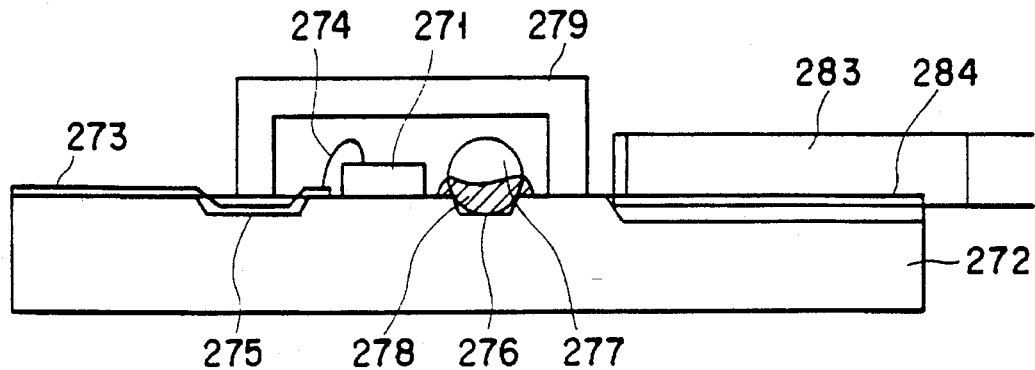
FIGS. 19A and 19B are sectional views showing the schematic arrangement of an optical semiconductor module according to the sixth embodiment.

FIG. 19A is a sectional view showing the schematic arrangement of an optical semiconductor module according to the sixth embodiment of the present invention. Reference numeral 271 denotes an optical semiconductor device which is mounted on an Si submount 272. An electrical wiring layer 273 is formed on the Si sub mount 272, and the electrical wiring layer 273 is electrically connected to the optical semiconductor device 271 with a bonding wire 274. Reference numeral 275 denotes a groove portion formed in the Si submount 272 and having the same structure as that shown in FIGS. 14A and 14B. Reference numeral 283 denotes a metal-coated optical fiber which is soldered and fixed in a groove 284 formed in the Si submount 272. The optical semiconductor device 271 is mounted such that the optical path of output light from the optical semiconductor device 271 is adjusted to coincide with the optical axis of the optical fiber 283.

Reference numeral 279 denotes a cap which is bonded to the Si submount 272 by soldering. Reference numeral 277 denotes a metal-coated lens body which is fixed by a solder 278 in a groove 276 formed in the Si submount 272. After the optical axis of the optical semiconductor device 271 is adjusted to the optical axis of the metal-coated lens body 277, they are fixed. Since the optical fiber 283 is fixed in the groove 284, when relative positions of the optical semiconductor device and the lens body 277 with respect to the groove 284 are defined by photolithography, optical coupling between the optical semiconductor device and the lens body can be obtained even if adjustment of their optical axes is rarely performed.

According to the optical semiconductor module, since a lens is incorporated in the optical semiconductor module, the optical coupling efficiency can be further increased. In addition, as in other embodiments, a cap can be directly arranged on an Si submount on which an optical semiconductor device, an optical fiber, and an optical coupling system are mounted to hermetically seal them at once. Therefore, the optical semiconductor module can be connected to an external circuit at a high density.

Figure 19B:
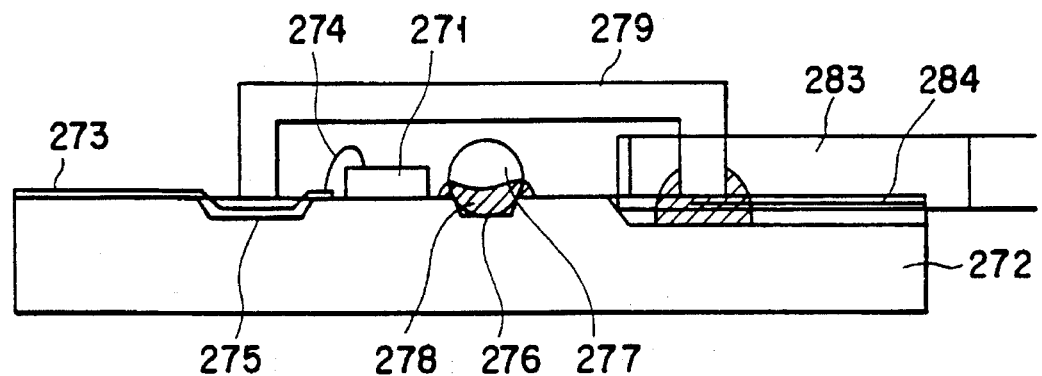

FIG. 19B shows a modification of this embodiment in which the optical fiber of this embodiment, an optical semiconductor device, and a lens body are hermetically sealed at once by the same method as that shown in FIGS. 16A and 16B.

According to this optical semiconductor module, since a lens is incorporated in the optical semiconductor module, the optical coupling efficiency can be further increased, and a cap is directly arranged on an Si submount on which an optical semiconductor device, an optical fiber, and an optical coupling system are mounted to hermetically seal them at once. Therefore, the optical semiconductor module can be connected to an external circuit at a high density, and the semiconductor module can be connected to an external circuit without any special consideration.

An optical semiconductor device and a semiconductor device which must be arranged as close to the optical semiconductor device as possible can be hermetically sealed at once to protect the optical semiconductor device and the like from influences such as contamination.

FIG. 20 is a perspective view showing the schematic arrangement of an optical semiconductor module according to the seventh embodiment of the present invention before a hermetic sealing cap is arranged.

This embodiment describes the arrangement of a so-called pigtail type optical module in which an optical fiber is directly connected to the module. Referring to FIG. 20, reference numeral 301 denotes a main substrate of the module; 302, an optical fiber guide groove; 303, an insulating film such as an $SiO_2$ or $Si_3N_4$ film; 304, electrical wiring layers for inputting/outputting signals; 305, insulators each of which is formed by burying a low-temperature-melting glass or the like; 306, signal electrodes; 307, ground electrodes; 308, bump electrodes for electrically connecting an optical semiconductor device and adjusting the position of the optical semiconductor device; 309, an hermetic sealing solder; 310, a fixing solder for fixing an auxiliary substrate 312 for holding optical fibers to the main substrate of the module; 311, the optical semiconductor device such as a semiconductor laser; 312, the auxiliary substrate for fixing the optical fibers; and 313, the optical fibers.

The electrical wiring layers 304 are connected to the signal electrodes 306 at the insulator 305 portions through the recessed portion of the Si submount, respectively. In this portion, since the insulator 305 portions are formed on the wiring layers 304, respectively, the wiring layers 304 are electrically insulated from the sealing solder 309.

Although the ground electrodes 307 are electrically connected to the main substrate of a module 301 by forming openings in the insulating film, when the main substrate of a module 301 consists of a non-conductive material, the ground electrodes 307 are connected to an external ground electrode through the sealing solder 309 like the electrical wiring layers 304. The optical fibers 313 and the auxiliary substrate 312 are fixed to each other by a refractory solder (e.g., AuGe, AuSn, or the like) having a relatively high melting point in advance, and selected portions are subjected to polishing or dicing so as to align the distal ends of the optical fibers 313 and the end face of the auxiliary substrate 312 on a single plane.

After the assembling process is performed until the structure shown in FIG. 20 is obtained, a hermetic sealing cap (not shown) is arranged by the sealing solder 309, and, as shown in FIG. 11B, gaps formed at the fixing portions of the optical fibers 313 are filled with an auxiliary sealing solder, thereby completing the optical semiconductor module.

FIG. 21 is a perspective view showing the schematic arrangement of an optical semiconductor module according to the eighth embodiment of the present invention. Referring to FIG. 21, reference numeral 101 denotes a main substrate of the module; 102, guide grooves for optical fibers; 103, an auxiliary substrate for holding the optical fibers; 104, a ribbon fiber; 105, an optical semiconductor device such as a semiconductor laser array; and 106, optical semiconductor device mounting electrodes which are bump electrodes as in the prior art. The main substrate 101 of the module and the auxiliary substrate 103 consist of, e.g., Si, and a substrate obtained such that V-grooves are formed by etching using a slit-like mask of the <110> or <1-10> direction on the (001)

plane of the substrate is used as each of the main substrate 101 and the auxiliary substrate 103. At this time, $Si_3N_4$ is preferably used as a mask material, and a KOH aqueous solution heated to 90° C. is preferably used as an etching solution.

A PbSn-based solder is used as each of the bump electrodes 106, and a solder whose shape is changed into a ball-like shape by a reflow is used as each of the bump electrodes 106. The shape and size of each of the bump electrodes 106 are not strictly limited, and the shape and size of each of the bump electrodes 106 are appropriately set according to the relative relationship between the shape and size of each of the bump electrodes 106 and the width of each of the guide grooves 102 which is set in consideration of the height of the mounted optical semiconductor device and a positional relationship between the core portions of the optical fibers and the guide grooves 102.

An example of the manufacturing process of this embodiment is as follows. The ribbon fiber or optical fibers 104 are fixed on the auxiliary substrate 103. As a fixing material used at this time, low-temperature-melting glass or a refractory solder (e.g., AuSn or AuGe) having a relatively high melting point is used, and a material whose temperature characteristics are defined such that the material is not melted in annealing of the subsequent step is used. Cutting and polishing for aligning the distal ends of the optical fibers 104 on a single plane are performed. In this case, a method such as a dicing method or a diamond polishing method is used, and a part of the auxiliary substrate 103 is processed simultaneously with the processing of the distal ends of the optical fibers, so that the end portions of the auxiliary substrate 103 and the optical fibers 104 are aligned on the same plane.

Thereafter, the optical semiconductor device 105, the auxiliary substrate 103, and the optical fibers 104 are sequentially or simultaneously mounted on the main substrate 101 of the module. At this time, the optical fibers 104 are fixed using a solder or resin having a melting point or hardening temperature lower than that of the material used for fixing the optical fibers 104 on the auxiliary substrate 103, and a material which does not substantially influence the positional relationship between the auxiliary substrate 103 and the optical fibers 104 is used the solder or resin. When a pressure is applied to the auxiliary substrate 103 toward the optical semiconductor device 105, the optical fibers 104 are arranged at positions having almost the same distance from the optical semiconductor element 105, and the reproducibility of optical coupling characteristics can be improved.

At this time, as shown in FIG. 22A, each of the optical fibers 104 is brought into contact with an end portion 108 of each of the guide grooves 102. However, since the optical fibers 104 are fixed by the auxiliary substrate 103, when an appropriate pressure in the lower direction is applied to the auxiliary substrate 103, the deformation and warpage of the optical fibers shown in FIG. 26 do not easily occur. For this reason, a core portion 107 of each of the optical fibers 104 can be precisely positioned. In addition, upon completion of the assembling process, deformation of the optical fibers 104 caused by a change in ambient temperature is minimized in the presence of the auxiliary substrate 103. For this reason, in the optical semiconductor module according to this embodiment, temperature characteristics can be much improved compared with those of the prior art.

FIG. 22B shows an embodiment obtained by improving the embodiment shown in FIG. 21. In the embodiment in FIG. 21, although the relative positions of the optical fibers 104 are defined by bringing the optical fibers 104 into contact with the end portions 108, when the optical fibers 104 are fixed by a soldering material having poor creeping characteristics, the fixing solder may be degraded over time. This problem is solved by the module shown in FIG. 22B. In this module, a main substrate 101 of the module and an auxiliary substrate 103 holding optical fibers 104 are fixed to each other by bump electrodes 106' like the optical semiconductor element 105. In this case, the distal ends of the optical fibers 104 need not be in contact with the main substrate 101 of the module, and the bump electrodes 106' control the relative positions of the optical fibers by the surface tension of the bump electrodes 106'. For this reason, no excessive stress acts on the optical fibers 104, and no excessive stress acts on the fixing members of the optical fibers 104. Therefore, the module has a long mechanical service life.

Although not described in the embodiments shown in FIGS. 21, 22A, and 22B, in addition to optical fibers for transmitting signals, a dummy optical fiber may be arranged at a level higher than those of the optical fibers for transmitting the signals such that a mechanical stress acts on only the dummy optical fiber. In addition, although the embodiments shown in FIGS. 21, 22A, and 22B describe only the optical semiconductor devices, other optical elements such as a lens and an optical isolator may be mounted simultaneously with the optical semiconductor device.

Figure 23:
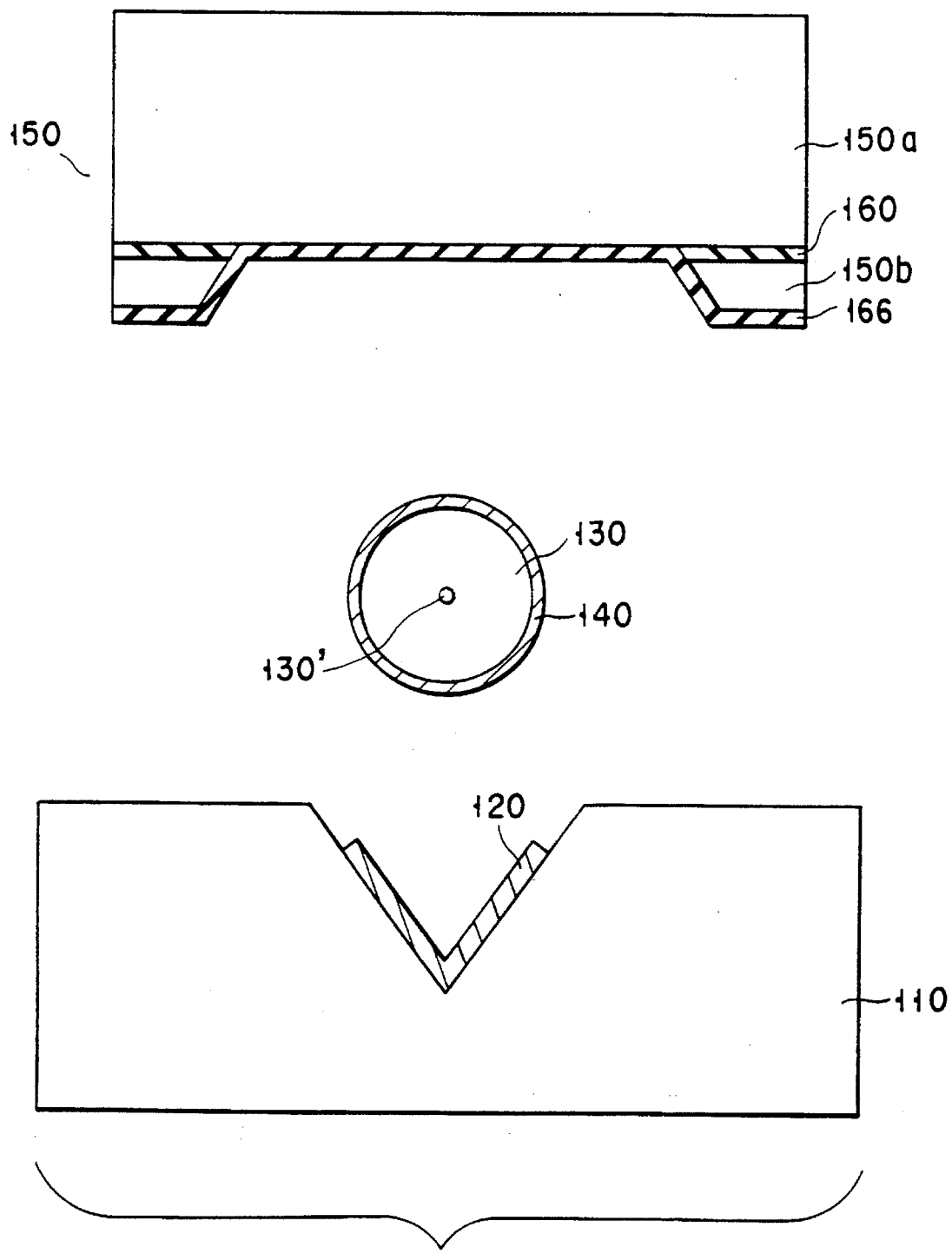
FIG. 23 is a sectional view showing the schematic arrangement of an optical fiber mounting holder and a mounting jig for defining a mounting height according to the ninth embodiment.

FIG. 23 is a sectional view showing the schematic arrangement of an optical fiber mounting holder and a mounting jig for defining a mounting height according to the ninth embodiment of the present invention. Reference numeral 110 denotes a mounting holder; 120, an optical fiber fixing material (solder); 130, an optical fiber; 130', a core of the optical fiber; 140, a coat formed on the optical fiber; 150, a height-definition mounting jig; and 160, a fixing preventive film for preventing the mounting jig 150 from being fixed to the optical fiber 130 or the mounting holder 110.

The mounting holder 110 is formed such that a V-groove is formed in, e.g., an Si substrate by photolithography and chemical etching. The mounting jig 150 can be formed such that a V-groove is formed in an Si substrate by photolithography and chemical etching like the mounting holder 110. The fixing preventive film 160 is a dielectric film such as an $SiO_2$ or $Si_3N_4$ film, and a material which easily forms a compound with and is easily bonded to the fixing material 120 is preferably used as the material of the fixing preventive film 160. In particular, when the base material of the mounting jig 150 is Si, an $SiO_2$ film obtained by thermally oxidizing the Si surface can be used as the fixing preventive film 160.

A relatively low-melting material such as In, PbSn, or AuSn is suitable for a metal solder used as the fixing material 120 because the material can reduce distortion or stress on the optical fiber. A layer of such a material can be formed by deposition or plating, and layers of such a material can be simultaneously formed in a large number of mounting holders in a wafer state as in the normal semiconductor process.

The fixing material 120 are not limited to those specified in the preceding paragraph. Various other materials may be used, provided that they can be deformed, though not exhibiting flowability at their melting points or lower temperatures. Were the fixing material 120 a material which exhibits flowability, at its melting point or a lower temperature, it could not hold the optical fiber 130. As a result, the optical fiber 130 would inevitably contact the inner surface of the groove and be eventually displaced. On the other hand, were the fixing material 120 a material which cannot be deformed at its melting point or a lower temperature, the mounting jig 150 could not serve to arrange the optical fiber 130 at a desired height. For example, the fixing material 120 may be high-purity Au, and may be heated to 200° C. to 250° C. and then be secured by thermo-compression bonding. Furthermore, the material 120 may no non-metal; it may be, for example, resin material.

The coat 140 of the optical fiber 130 is desirably formed using a metal which is easily bonded to a soldering material. The coat 140 of the optical fiber 130 is formed such that Ni or Cr is coated on the optical fiber 130 by, e.g., electroless plating (normal optical fiber) or electrolytic plating (carbon-coated optical fiber), or the coat 140 may be formed by coating Au or the like on the Ni or Cr coating as needed.

As an example, a case wherein the outer diameter of the optical fiber 130 is 125 μm will be described below. Ni is coated on the outer surface of the optical fiber 130 to have a thickness of 1 μm, and Au is coated on the Ni coating to have a thickness of 5 μm. Since the thicknesses of the metal coatings serve as main parameters for determining a deviation correcting range obtained when the optical fiber is mounted, the thicknesses are set to be slightly larger than a deviation amount of a mounting position obtained when a conventional method is used. The mounting holder 110 is formed as follows. That is, a 200-nm $SiO_2$ film formed by thermal oxidation and a 400-nm $Si_3N_4$ film are formed on an Si substrate having the (100) plane, an opening having a mask width of 155 μm is formed by photolithography, and V-groove etching is performed using an KOH aqueous solution. The fixing material 120 is formed as follows. That is, a plurality of Au and Sn films are deposited or plated to obtain an Sn composition ratio of 20% (weight ratio) and to have a mask width of 100 μm and a thickness of 15 μm.

At this time, when the layer of a metal such as Ti or Cr having a high reaction temperature is formed as an underlying metal layer for the fixing material 120 to have a thickness of about 50 nm, a solder can be prevented from being peeled from the Si substrate while the solder is melted and compounded (alloyed). In addition, when an $SiO_2$ film is formed at a portion other than the region in which the soldering metal is formed, a loss caused by the flow of the solder can be prevented. The fixing material 120 need not be formed in the entire region of the V-groove of the mounting holder 110, and the fixing material 120 may be intermittently formed in the direction of the groove. When the solder is intermittently formed in the direction of the groove, although the mounting strength of the optical fiber is slightly decreased, a stress acting on the optical fiber 130 can be reduced to prevent cracks or the like in the optical fiber 130.

The mounting jig 150 has a groove, having a flat bottom, for defining the height of the mounting position, and the depth of the groove is set as follows. That is, when the bottom portion of the groove is in contact with the upper side of the coat 140 of the optical fiber, and the lower portion of the coat 140 of the optical fiber 130 and the solder 120 are alloyed, the flat region (reference surface) is set to be in contact with the flat portion of the mounting holder 110, and the core 130' of the optical fiber 130 has a predetermined height.

In this manner, when the mounting jig having the groove having a flat bottom is used, the height of the mounting position, i.e., a depth from the height reference surface of the jig to the optical fiber contact portion can be easily set.

The mounting jig 150 according to this embodiment is formed as follows. That is, a so-called Si directly bonded substrate is formed by adhering two Si substrates 150a and 150b through an $SiO_2$ film 160', and the Si substrate 150b of the Si directly bonded substrate is polished to have a thickness corresponding to the depth of a desired groove. A pattern is formed by photolithography described above, and the Si substrate 150b is selectively etched. The selective etching of Si can be performed by chemical etching using the KOH aqueous solution described above. When the etching reaches the film 160', an etching rate is abruptly decreased. For this reason, selective etching can be relatively easily performed. Thereafter, the fixing preventive film 160 is formed as described above.

Figure 24A:
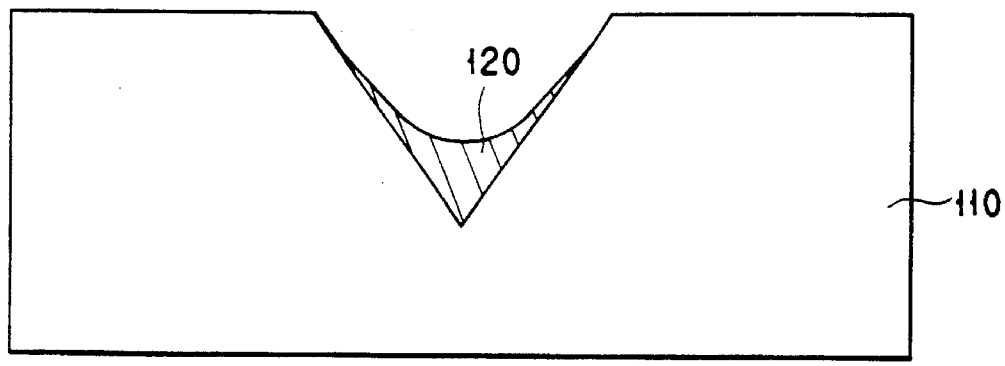
FIGS. 24A and 24B are sectional views showing procedures of mounting an optical fiber on the optical fiber mounting holder shown in FIG. 23.
Figure 24B:
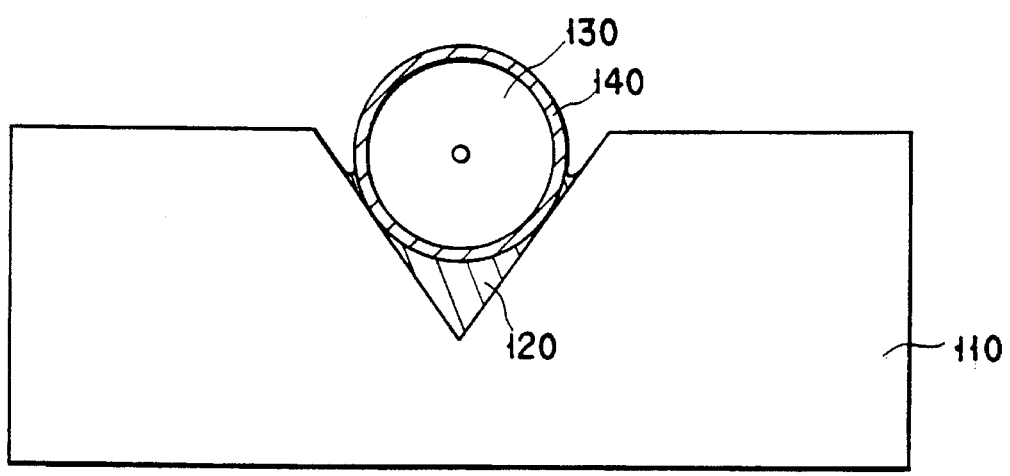
Figure 25:
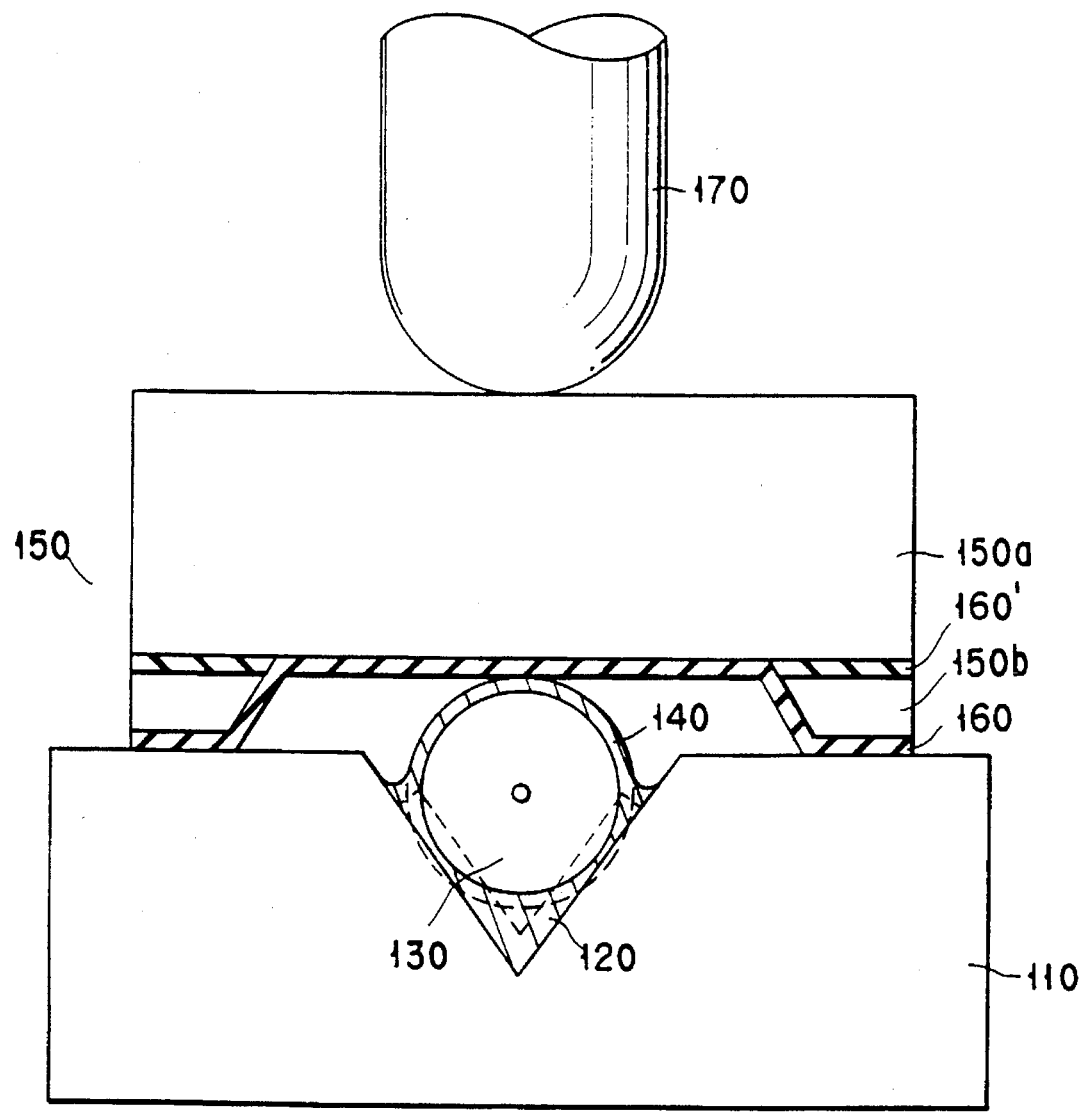
FIG. 25 is a sectional view showing a procedure of mounting an optical fiber on an optical fiber mounting holder using the mounting jig shown in FIG. 23.

Procedures of mounting an optical fiber using the above example are shown in FIGS. 24A, 24B, and 25. The mounting holder 110 is heated to a temperature of 320° C. in a non-oxygen atmosphere (in an $N_2$, $H_2$, or Ar gas atmosphere) to melt Au and Sn in the fixing material 120 and to form an AuSn eutectic solder (Sn composition ratio of 20%). At this time, as shown in FIG. 24A, the solder is gathered on the bottom portion of the V-groove of the mounting holder 110 by the gravity and the surface tension of the solder, and a solder reservoir to bury the V-groove. As shown in FIG. 24B, although the metal-coated optical fiber 130 is inserted into the V-groove, the optical fiber 130 may be mechanically, finely moved to obtain good wetting between the optical fiber 130 and the solder. The solder 120 is then cooled to the melting point (280° C.) or a lower temperature. Thereafter, a mechanical pressure is applied to the optical fiber 130 to assure the position of the optical fiber 130. However, when a pressure is simply applied as described in the prior art, the optical fiber 130 has a relative positional deviation with the mounting holder 110 caused by the dispersion of the thicknesses of the formed solder and the metal coat of the optical fiber 130.

Therefore, according to this embodiment, the mounting jig 150 whose height is defined as shown in FIG. 25 is used, and a mechanical pressure is applied to the optical fiber 130 by a pressurizing jig 170 to suppress the positional deviation of the optical fiber 130. That is, the mounting jig 150 is placed on the optical fiber 130 in the state shown in FIG. 24B, and the position of the optical fiber 130 is assured by applying a mechanical pressure to the mounting jig 150 as shown in FIG. 25. This pressure application presses the optical fiber 130 into the soltened solder, and the metal (in this case, mainly Au) of the coat 140 of the optical fiber is deformed under pressure and reacts with the solder so as to be alloyed. However, when the flat portion of the mounting jig 150 is brought into contact with the flat portion of the mounting holder 110, the pressure applied to the optical fiber 130 is reduced to stop the pressing operation. Therefore, according to this embodiment, when the positional deviation of the optical fiber when the optical fiber is mounted falls within the range of the thickness of the coat of the optical fiber, this deviation can be absorbed. As long as the optical fiber 130 is mounted using the same mounting jig 150, the same mounting conditions are set for the plurality of mounting holders 110.

For example, as shown in FIG. 26, when a different mounting holder 110 is used, and the groove of the mounting holder 110 is slightly changed, e.g., even when the depth of the groove is larger than that of the groove of the mounting holder 110 shown in FIGS. 23 to 25, the mounting position of the optical fiber 130 is not changed because the mounting position of the optical fiber 130 is determined by the depth of the groove of the mounting jig 150.

An example of the mounting position deviation obtained by this method is ±1 µm or less when the Ni and Au coatings of the metal coat described above are 1 µm and 5 µm, respectively. Therefore, the method can be satisfactorily applied to a single-mode fiber. Since the absolute value of the mounting position is determined by a combination of the processing precision of the mounting jig 150 and that of the mounting holder 110, the mounting jigs 150 having different sizes are formed by the method described above, and the mounting jigs 150 are selectively used according to the processing state of the mounting holder 110.

In the optical fiber mounting body completed as described above, even when the surface of the mounting holder 110 is slightly uneven, the optical fiber 130 is positioned near the center of the average shape of the uneven surface, and, therefore, a method of processing the mounting holder 110 can be less strict. For example, even when the mounting holder 110 is formed by a method such as a mechanical cutting method or a molding method, finishing such as polishing is not necessarily required, not only the cost of the mounting holder 110 can be reduced but also the reproducibility of the shape of the mounting holder 110 can be improved by a method such as a molding method.

In this manner, according to the present invention, the height of a mounting position can be set by carefully performing the polishing process, and setting precision can be easily improved. In mounting an optical fiber array, as shown in FIG. 27, since the arrangement pitch of the optical fibers 130 is determined by only the mounting holder 110, the optical fiber array is free from errors and deviations.

In the embodiment shown in FIGS. 23 to 27, although the metal coat is applied on the optical fiber, when the optical fiber can be fixed in the groove of the mounting holder without a metal coat, the metal coat can be omitted. In addition, the optical fiber fixing material is not limited to a solder, and any plastic material having excellent mechanical holding characteristics can be used as the optical fiber fixing material.

Figure 27:
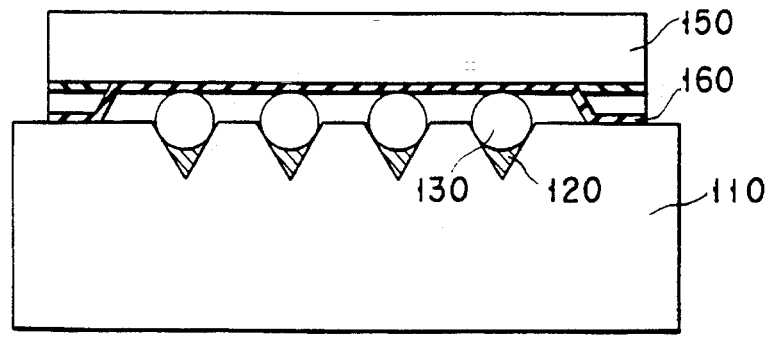
FIG. 27 is a sectional view showing a state wherein an optical fiber array is mounted on the optical fiber mounting holder.

Referring to FIG. 27, when 128 optical fiber arrays are mounted at a pitch of, e.g., 250 µm, the mounting jig 150 becomes a bridge having a length of the 32 mm, deflection of the mounting jig poses a problem. For this reason, when the number of optical fibers to be mounted is large, height reference portions (150b) are preferably arranged for every optical fiber or every several optical fibers. When optical fibers are arranged at a pitch of about 250 µm, the height reference portions (150b) can be arranged for every optical fiber.

Figure 28:
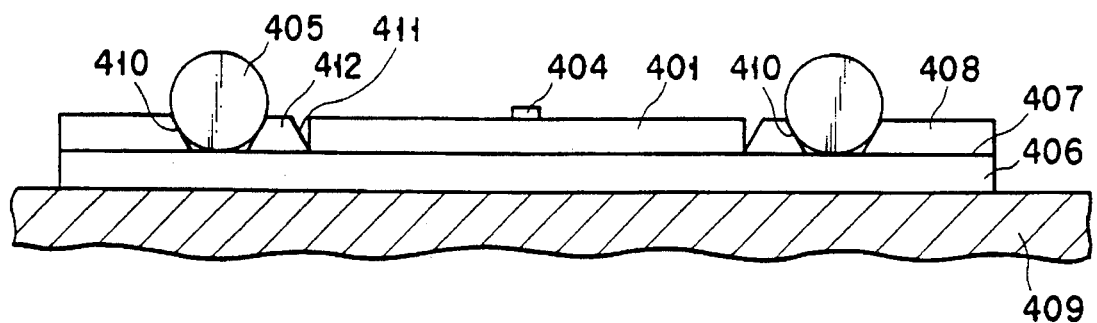
FIG. 28 is a side sectional view showing the arrangement of an optical semiconductor module according to the tenth embodiment of the present invention.

FIG. 28 is a side sectional view showing the arrangement of a semiconductor module according to the tenth embodiment of the present invention. Two silicon wafers, e.g., wafers 406 and 408, are smoothly polished to have thicknesses of 200 µm and 250 µm, respectively, and the wafers 406 and 408 are directly bonded to each other through an oxide film 407 obtained by thermally oxidizing the surfaces of the wafers 406 and 408. A method of directly adhering the wafer 406 to the wafer 408 through the oxide film 407 is described in detail in, e.g., Jpn. Pat. Appln. KOKAI Publication Nos. 61-5544 and 61-42154 or the like.

Figure 29:
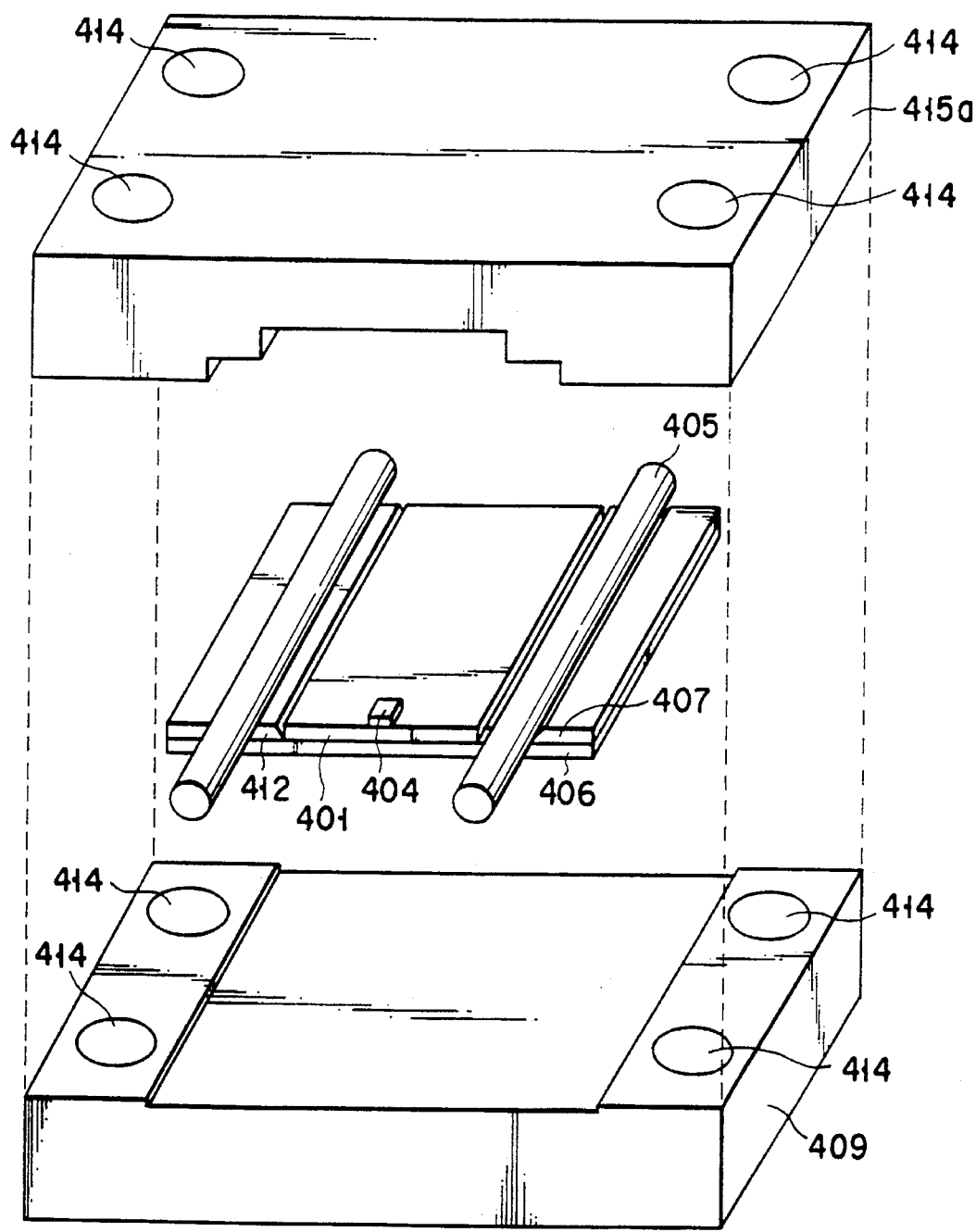
FIG. 29 is a perspective view showing the overall arrangement of a semiconductor module according to the tenth embodiment of the present invention.

Recessed portions 410 for fixing two guide pins 405 and a recessed portion 411 for fixing a semiconductor chip mounting substrate 401 are formed by a mask aligning process and a selective etching process. At this time, when the etching is performed to reach the contact surface between the two wafers 406 and 407, the etching is automatically stopped by the oxide film 407. Thereafter, the oxide film 407 on the bottom surface of the recessed portion 411 is removed by hydrofluoric acid or the like, and an AuCr or AuSn film is formed on the bottom surface by a method such as deposition. Thereafter, the substrate 401 on which a semiconductor chip 404 is mounted is mounted in the recessed portion 411. As shown in FIG. 29, the resultant structure is interposed between a press plate 415a and a stem 409 while the ambient temperature is increased, and the press plate 415a is screwed on the stem 409 through screw holes 414.

when the press plate 415a is screwed on the stem 409, the positional relationships between the guide pins 405 and the guide pin mounting recessed portions 410 and the shape of press plate 415a vary depending on whether differences in the degrees of deformation (to be referred to as degrees of deformation hereinafter) caused by heat an external force, the thermal expansion coefficients, and hardness values of first and second semiconductor modules positioned opposite to each other and connected to each other through the guide pins 405 coincide with the degree of deformation of the structure of this embodiment. That is, the degree of deformation of the first semiconductor module coincides with the degree of deformation of the structure of this embodiment, and the degree of deformation of the second semiconductor module does not coincide with the degree of deformation of the structure of this embodiment. When the degree of deformation of the second semiconductor module is, for example, a so-called MT (Mechanically Transferable) connector is different in material and thermal expansion coefficient, and variations caused by an interval and pin pitch between connecting guide pins from that of the first semiconductor module, since the intervals and pin pitches between the connecting guide pins may be different from each other in these semiconductor modules to be connected to each other, one or both of the semiconductor modules and their dimensional precision may be degraded.

For this reason, these two modules are caused to oppose each other and positioned such that the size of the first semiconductor module must be matched with the size of the second semiconductor module according to the following procedure. This method will be described below. The guide pins 405 shown in FIG. 29 are inserted into the recessed portions of the second module. While this state is kept, the guide pins are mounted in the recessed portions 410 in the first semiconductor module. At this time, the bottom portions of the guide pins 405 are located in contact with the bottom surfaces of the recessed portions 410, respectively.

Thereafter, the press plate 415a having a flat press portion is brought into contact with the guide pins 405, and the press plate 415a is screwed and fixed on the stem 409 through the screw holes 414. At this time, the guide pins 405 are pressed only downward against the bottom portions, and no force acts on the semiconductor chip and the submount between the two guide pins 405. For this reason, the high precision of the second semiconductor module is maintained regardless Of the interval between the guide pins 405 and the shift of the central position of the interval. In addition, the direction of the whole structure of the first and second semiconductor modules including the guide pins 405 is fixed parallel to the direction of the recessed portions.

Figure 30:
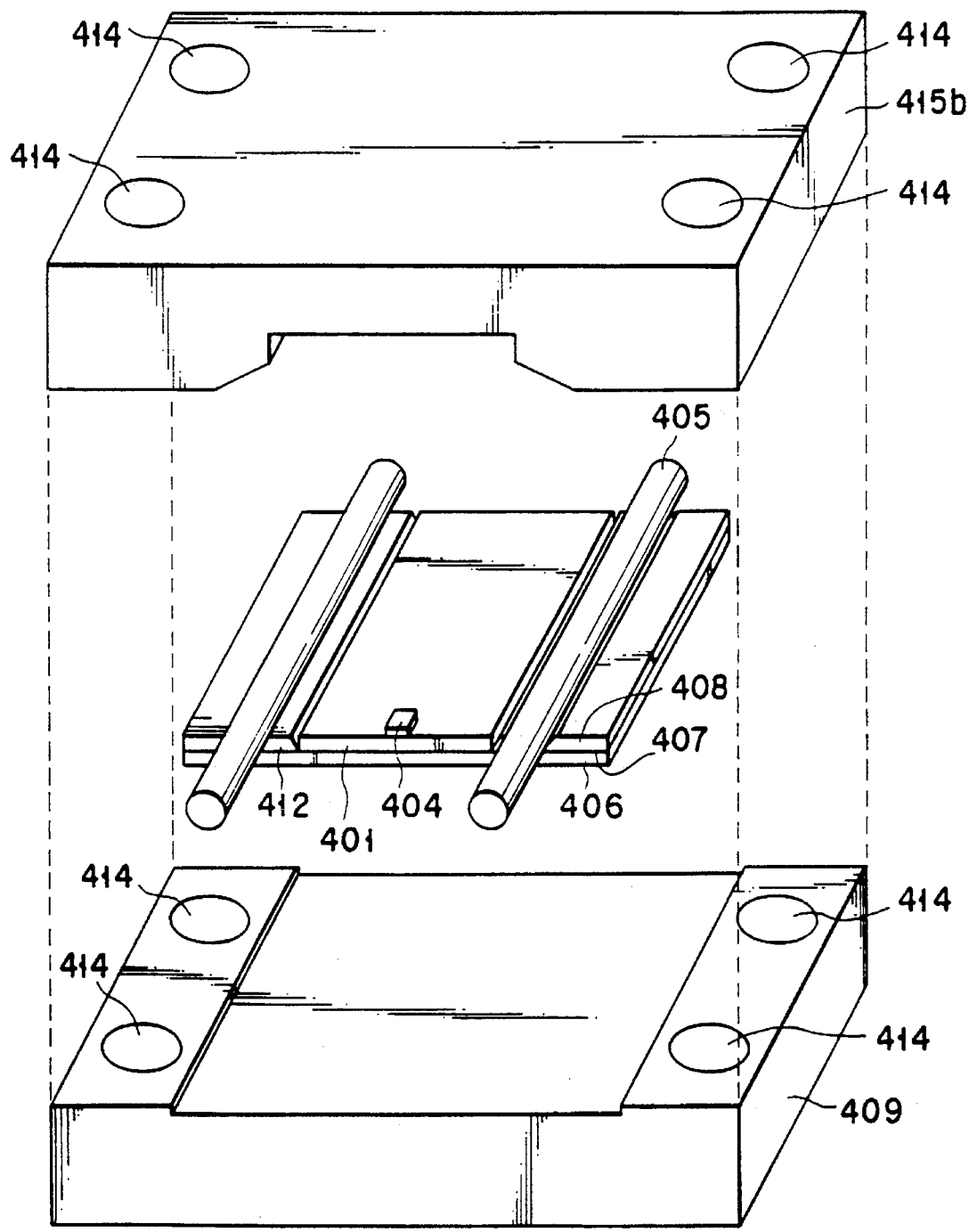
FIG. 30 is a perspective view showing a modification of the tenth embodiment of the present invention.

A case wherein both the first and second semiconductor modules have the same degree of deformation as that of this embodiment will be described below. A degree of coincidence between the sizes of semiconductor modules according to this embodiment formed through a PEP (photoetching process) is excellent. For this reason, unlike in positioning of the semiconductor modules having different degrees of deformation so as to oppose each other, such positioning need not be performed with reference to the semiconductor module having poor dimensional precision. A screwing method at this time is shown in FIG. 30.

The guide pins 405 are mounted in the corresponding guide pin mounting recessed portions 410 of the first and second semiconductor modules. At this time, the bottom portions of the guide pins 405 are in contact with the bottom portions of the guide pin mounting recessed portions 410. The two semiconductor modules are pressed by a press plate 415b having inclined press surfaces, the guide pins 405 are pressed against the bottom surfaces in a vertical direction, and each of the guide pins 405 is pressed against one side surface of a corresponding one of the recessed portions 410 in a lateral direction (inner side surface in this example). Since the force acting from the lateral direction is diffused to the wafer 406 by members (to be referred to as buffer members hereinafter) 412 present between the guide pins 405 and the semiconductor chip mounting substrate 401, an excessive force acting on the region between the buffer members 412 can be prevented. The external force preventive operation in the lateral direction can prevent damage, caused by the external force, to the semiconductor chip mounting substrate when the semiconductor modules are connected to each other. For this reason, a semiconductor module having a recessed portion in which a semiconductor chip susceptible to cracking can be directly mounted in place of a submount and connected to another semiconductor module.

Figure 32A:
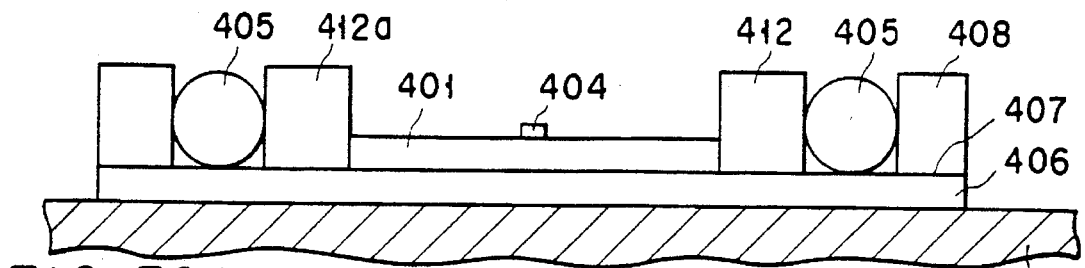
FIGS. 32A to 32D are sectional views showing still another modification of the tenth embodiment of the present invention.
Figure 32B:
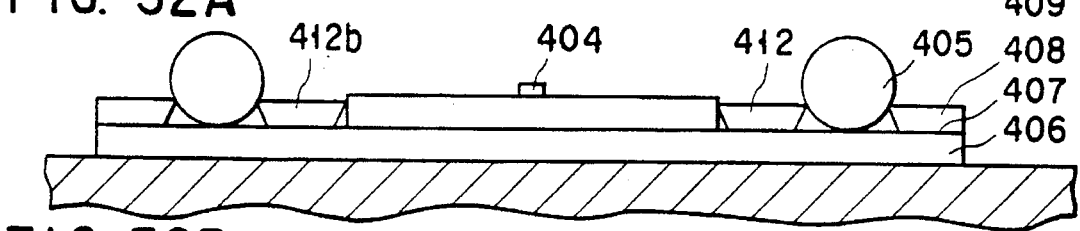
Figure 32C:
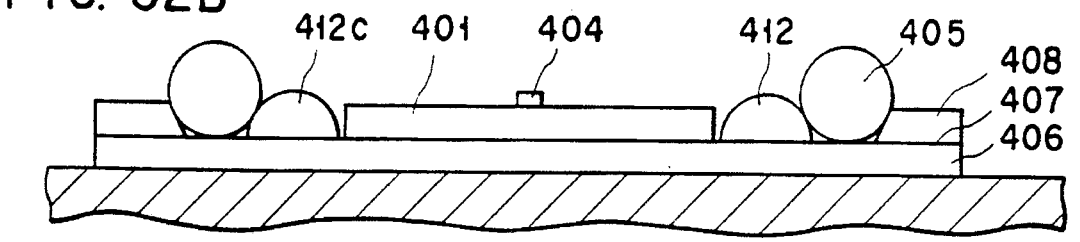
Figure 32D:
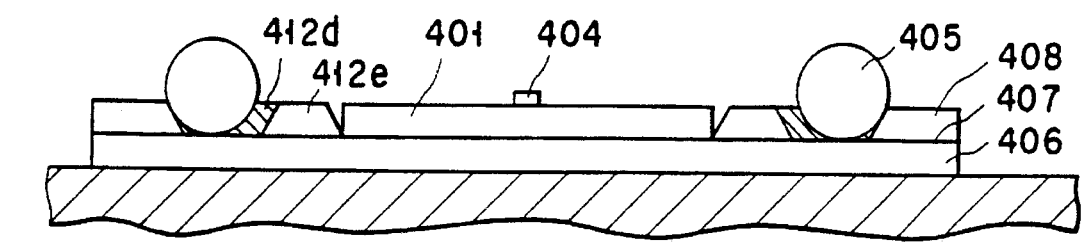

The material of the buffer members 412 is not limited to silicon, and a compound such as $Si_3N_4$ and $SiO_2$, glass, or a semiconductor material having a sufficient thickness and strength capable of withstanding the force acting from the guide pins 405 to the buffer members 412 can be used as the material of the buffer members 412. In addition, a polymer material such as plastic, rubber, or polyimide having a sufficient strength and elasticity may be used as the material of the buffer members 412. The sectional shape of each of the buffer members 412 is not limited to a trapezoidal shape, and the sectional shape may be a rectangular shape shown in FIG. 32A, an inverted trapezoidal shape shown in FIG. 32B, or a semicircular shape shown in FIG. 32C. When a polymer material and an inorganic material are combined with each other as shown in FIG. 32D, the external force preventive operation is improved. In addition, since the sizes of the two semiconductor modules coincide with each other, the semiconductor modules are positioned to oppose each other at a high precision by screwing them.

when etching for forming the recessed portions is performed at a high precision, and each of the guide pins 405 is simultaneously brought into contact with the bottom surface and both the side surfaces of a corresponding one of the recessed portions, the guide pins 405 may be pressed only downward. When the semiconductor module is fixed by screwing using a press plate 415c having a flat press surface and inclined press surfaces, the guide pins 405 slide along the guides of the press plate 415c to reach the flat press surface. For this reason, in screwing the press plate 415c, the press plate 415c can be easily positioned and fixed.

In this manner, since the guide pins 405 are fixed in the recessed portions formed by etching as described above, reliable positioning of the guide pins 405 can be horizontally performed independently of cutting errors of a submount or a semiconductor chip. As described above, since both the bottom surfaces of the guide pins 405 and the bottom surface of the submount or semiconductor chip are in contact with a surface exposed by selective etching, the positions of the guide pins and the submount or the semiconductor chip can be reliably, vertically adjusted with reference to the upper surface of the wafer 406 or the upper surface of the oxide film 407. In addition, after a plurality of semiconductor modules are connected to each other, the bottom surfaces of the submounts or the semiconductor chips of the semiconductor modules coincide with each other regardless of the thickness of the wafer 406 of each of the semiconductor module because the bottom surfaces of the guide pins 405 and the bottom surface of the submount or semiconductor chip always coincide with each other in each semiconductor module.

The number of the guide pins 405 is not limited to two, and three or more guide pins may be arranged. In addition, a semiconductor laser, a light-receiving element, a fiber, an amplifier element, a waveguide, or the like may be used in place of the semiconductor chip 404. In addition, the number of semiconductor chips is not limited to one, and a plurality of semiconductor chips may be arranged in an array form.

Figure 33:
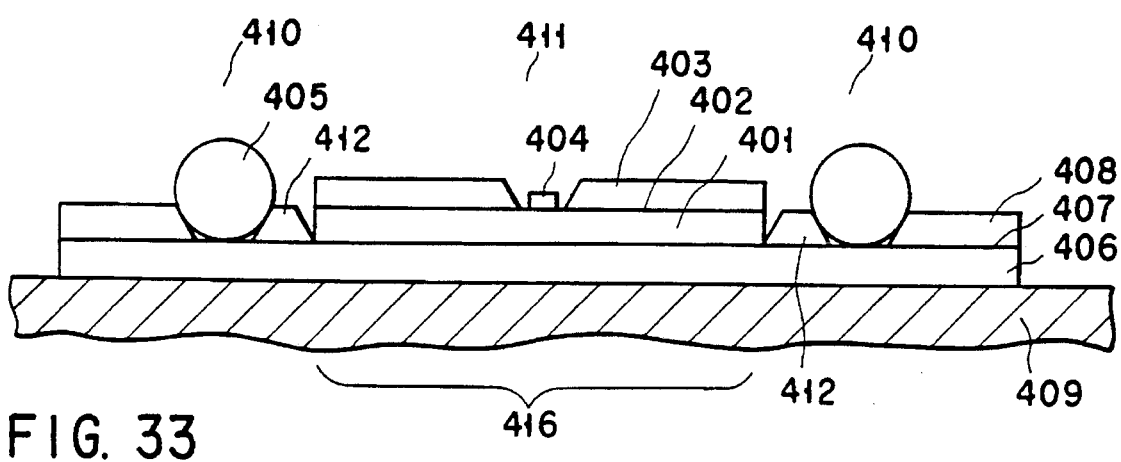
FIG. 33 is a sectional view showing the arrangement of a main part of a semiconductor module according to the eleventh embodiment.

FIG. 33 is a side sectional view showing the arrangement of a semiconductor module according to the eleventh embodiment of the present invention. The same reference numerals as in FIG. 28 denote the same parts in FIG. 33, and a description thereof will be omitted. According to this embodiment, as a substrate 416 on which a semiconductor chip 404 is mounted, a silicon submount 416 obtained by directly adhering a silicon wafer 401 to a silicon wafer 403 through an oxide film 402 is used, as in a conventional semiconductor module. In this case, the silicon submount 416 can be precisely positioned on the silicon wafer 406, and the semiconductor chip 404 can be precisely positioned on the silicon submount 416.

Figure 34:
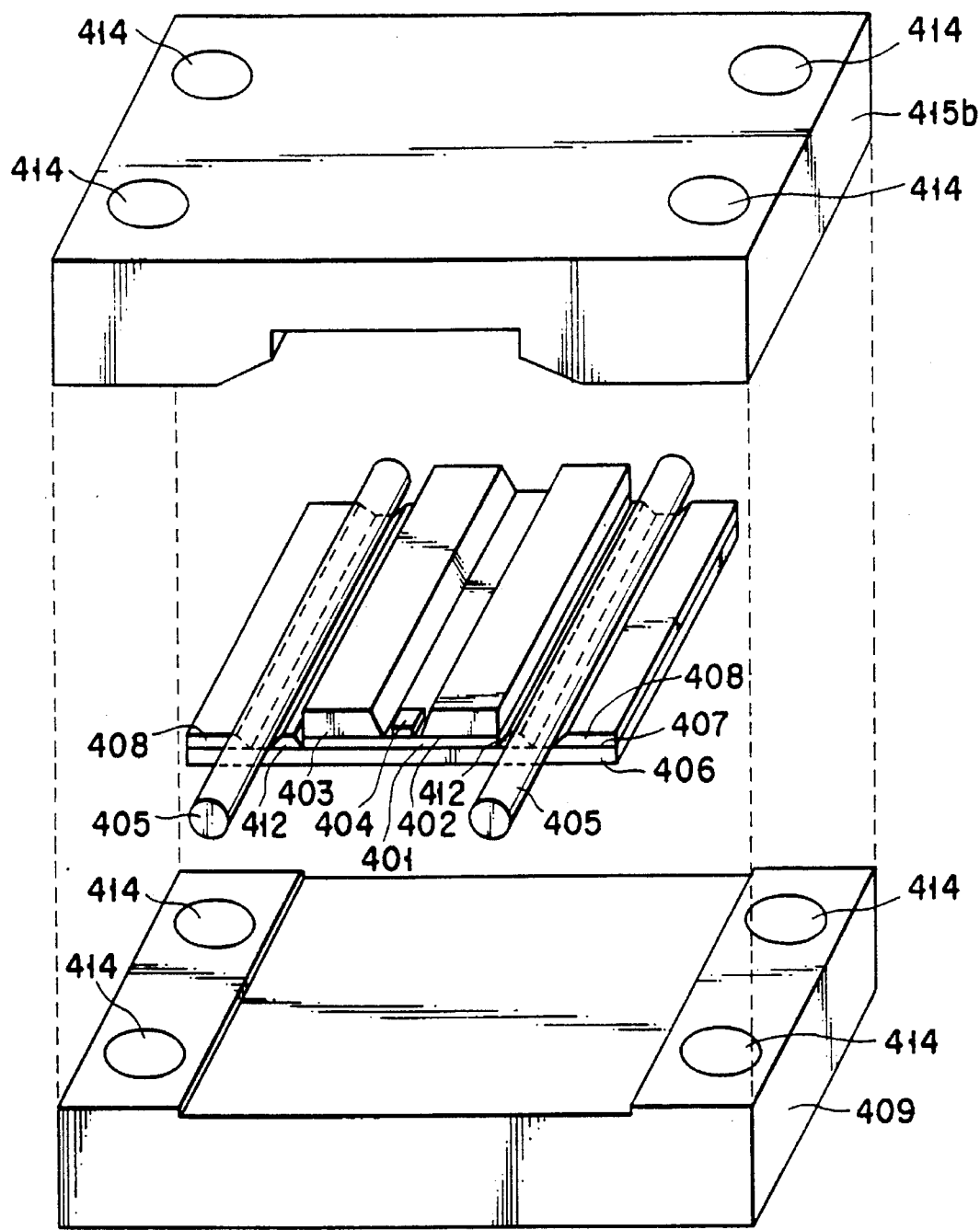
FIG. 34 is a perspective view showing the overall arrangement of a semiconductor module according to the eleventh embodiment.

In this case, as shown in FIG. 34, a press plate 415b is used, the silicon wafers 406 and 408 are interposed between the press plate 415b and the stem 409, and the press plate 415b and the stem 409 are screwed and fixed to each other through screw holes 414. The screwing method used in this case is the same as described in FIG. 30.

FIG. 35 is a perspective view showing the schematic arrangement of an optical semiconductor module according to the twelfth embodiment of the present invention. This embodiment is an example using a so-called ribbon fiber constituted by an optical fiber array. In particular, FIG. 35 shows the arrangement of a connector type optical module in which an optical fiber is separated from the module.

Referring to FIG. 35, reference numeral 501 denotes a module substrate; 504, electrical wires for inputting/outputting signals; 505, an insulator obtained by burying low-melting glass or the like; 509, a sealing solder for hermetic sealing; 511, an optical semiconductor device such as a semiconductor laser; 514, a hermetic sealing cap; and 515, lenses for optically connecting the optical semiconductor device 511 to optical fibers. In this case, the electrical wires 504 are formed to be buried in grooves formed in the module substrate 501 through an insulating film.

Reference numerals 516, 517, and 518 denote a directly bonded substrate described in the tenth embodiment. This substrate is obtained by directly adhering a silicon wafer 516 to a silicon wafer 518 through an $SiO_2$ film 517. Reference numeral 519 denotes each buffer portion formed by etching the silicon wafer 518 of the directly bonded substrate; and 520, each guide pin for connecting the connector of a ribbon fiber. Reference numerals 521 and 523 denote stems for fixing the overall module. The stems are screwed to each other through screw holes 524 and 522, and at the same time, the guide pins 520 are fixed.

In this embodiment, the cap 514 consists of a transparent material, input/output light to/from the optical semiconductor device 511 is focused by the lenses 515, and light input/output operations between the optical semiconductor device 511 and an external optical element are performed through the cap 514. In this case, when the wavelength of light used in the optical semiconductor device 511 is set to be 1 µm or more (e.g., 1.3 µm), silicon can be used as the material of the cap 514.

Figure 36:
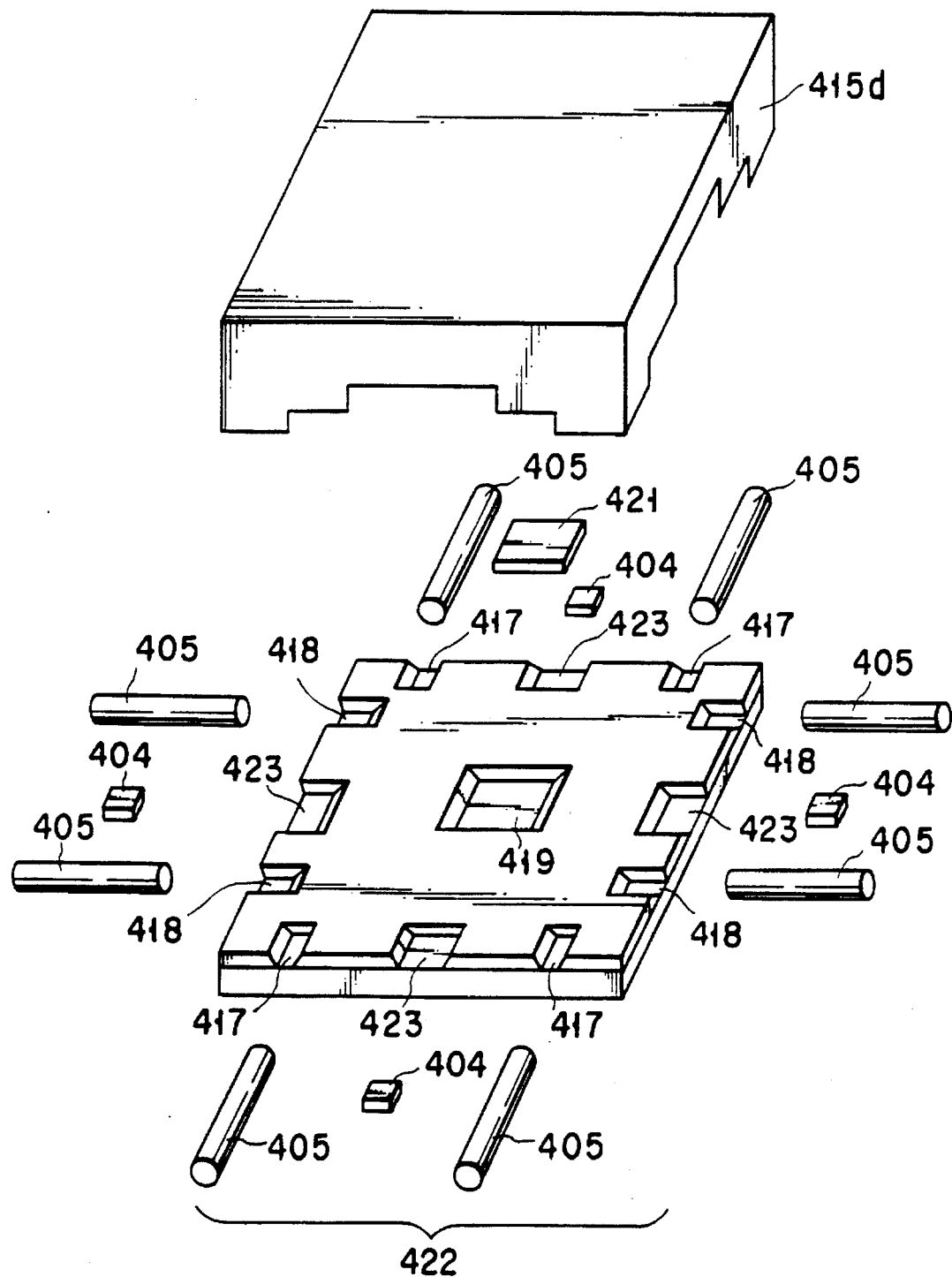
FIG. 36 is a perspective view showing the schematic arrangement of a semiconductor module according to thirteenth embodiment.
Figure 37:
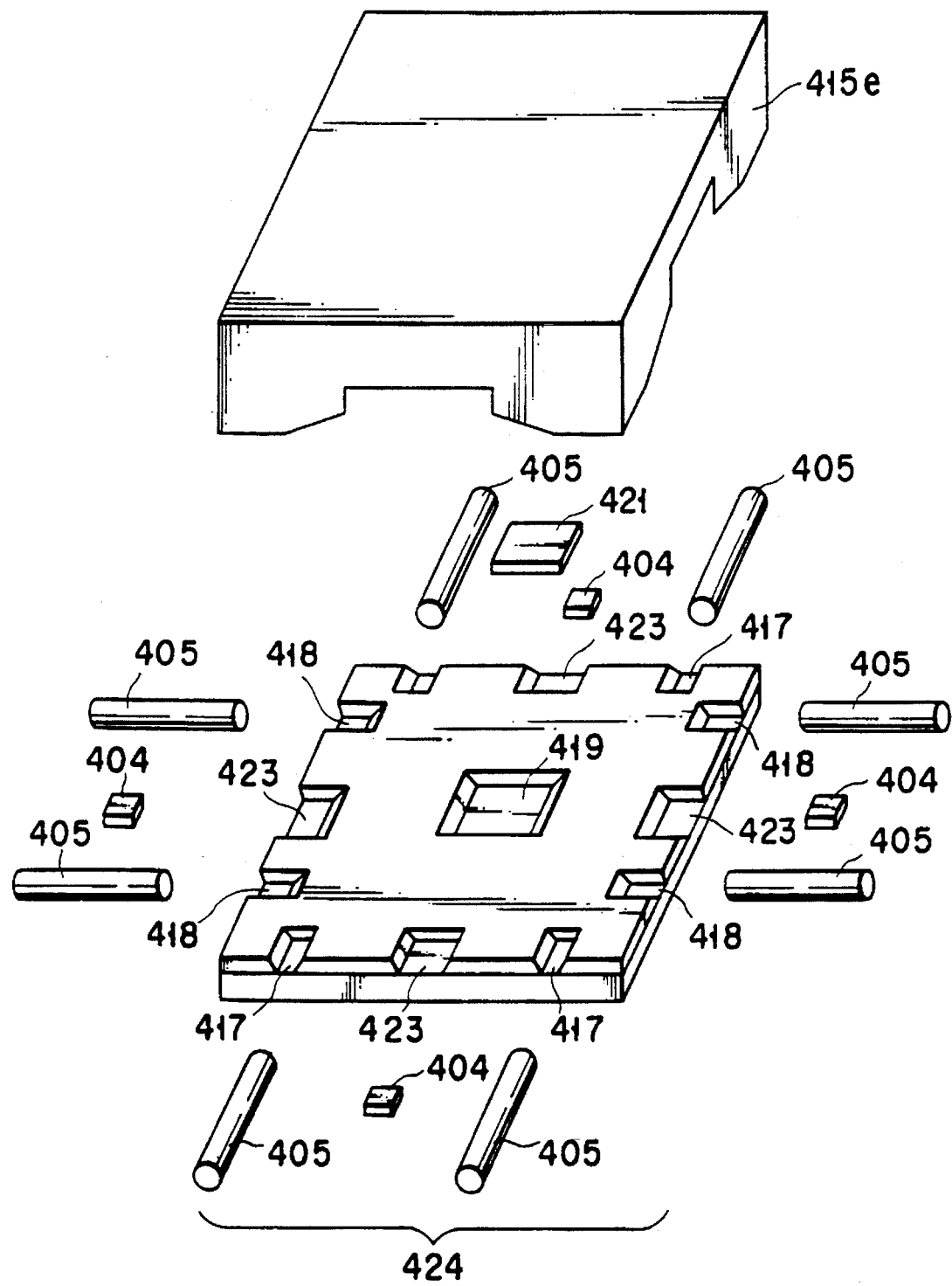
FIG. 37 is a perspective view showing a modification of the thirteenth embodiment.

FIG. 36 is a perspective view showing the schematic arrangement of an optical semiconductor module according to the thirteenth embodiment of the present invention. Recessed portions 417 in an X direction and recessed portions 418 in a Y direction used for guide pins and recessed portions 423 used for semiconductor chips are formed in an bonded substrate mount 422 by the same process as described in the ninth embodiment. Semiconductor chips 404, guide pins 405, and an IC chip 421 are soldered on the recessed portion 423, the recessed portions 416 and 418, and a recessed portion 419, respectively, by the same process as described in the ninth embodiment. The resultant structure is positioned and fixed by pressing it by a press plate 415d. A press plate used for positioning by screwing may have inclined press surfaces as in a press plate 415e shown in FIG. 37.

Figure 38:
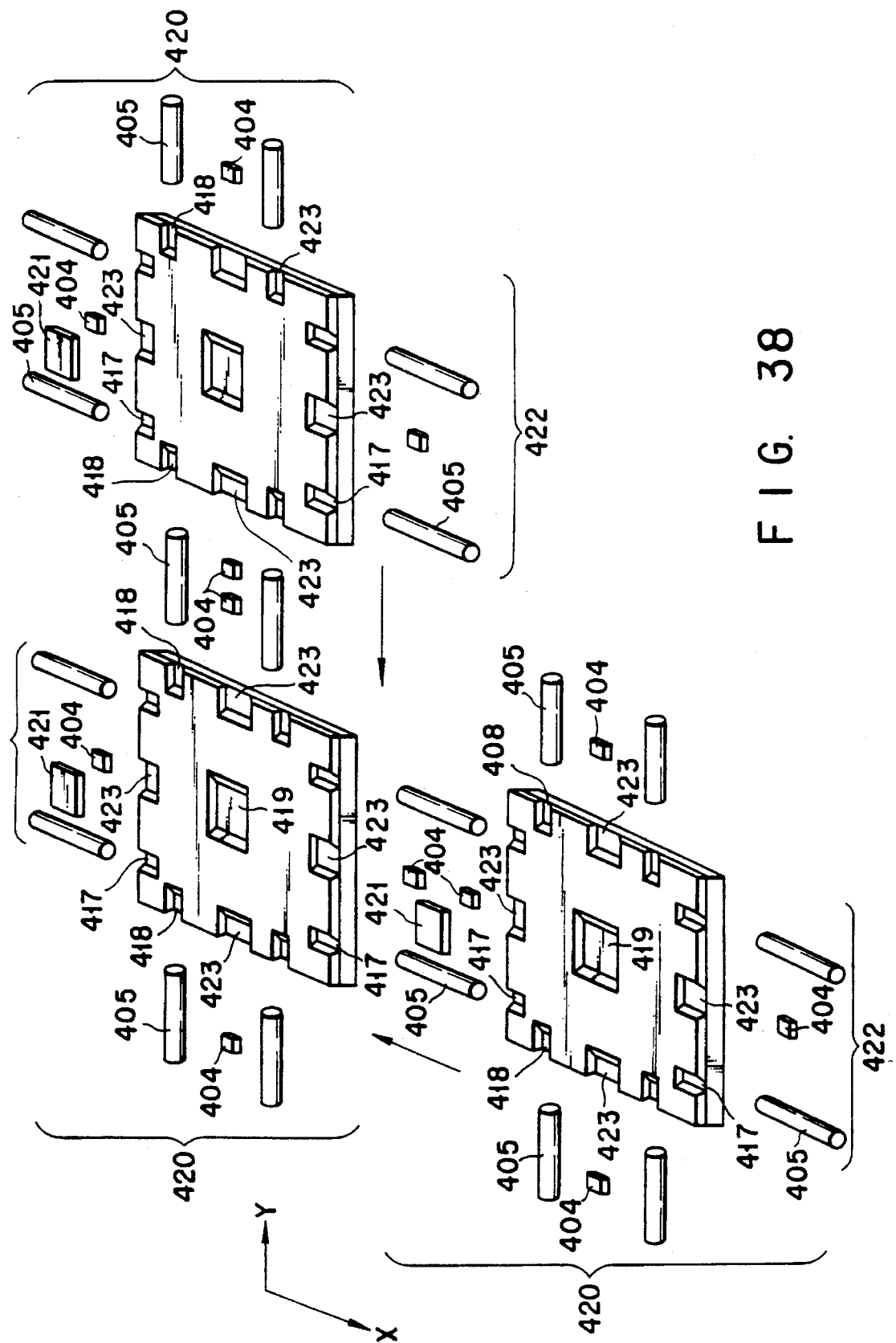
FIG. 38 is a perspective view showing an example in which semiconductor modules according to the thirteenth embodiment are connected to each other in X and Y directions.

The semiconductor module according to this embodiment can be connected another semiconductor module in all directions by the guide pins 405 formed in the X and Y directions. FIG. 38 shows an example wherein semiconductor modules according to this embodiment are connected to each other. Semiconductor modules 420 are connected to each other through the guide pins 405.

The number of the guide pins 405 is not limited to two, and three or more guide pins may be arranged. In addition, an optical semiconductor device and an optical passive element are used as the semiconductor chip 404 and the IC chip 421, respectively, and submounts used in the prior art may be used in place of the semiconductor chip 404 and the an IC chip 421. The number of semiconductor modules is not limited to one, and a plurality of semiconductor modules may be arranged in an array form.

In a semiconductor module such as a so-called IC card in which semiconductor integrated circuits are mounted on a portable substrate at a high density, the position of the input/output connector of the semiconductor module must be coupled to another coupling body, e.g., an optical connector or multi-pin electrical connector, such that their positions are precisely adjusted to each other because of the following reasons. In the former case, a high positional precision is required when a single-mode optical fiber or an optical waveguide is optically coupled to a semiconductor laser. In the later case, the number of connection pins is larger as the storage capacity of the IC card is larger, and intervals between the connection pins are decreased, thereby decreasing the size of each pin. For example, when an optical fiber is coupled to a semiconductor laser, a precision of ±5 µm or less is required in a multi-mode optical fiber, and a precision of ±2 µm or less is required in a single-mode optical fiber. In addition, when an IC card is used, its required precision is gradually more strict, and a precision of ±10 µm or less at a pitch of 100 µm will be required in the future. In particular, when the IC card must be detachably used, optical and electrical wires are not easily positioned. However, when the connection structure of the semiconductor module formed by the guide pins is applied to the wire connecting portion of an IC card, the IC card capable of easily positioning wires can be realized.

FIG. 39A is a perspective view showing the schematic arrangement of a semiconductor module according to the fourteenth embodiment, and FIG. 39B is a side sectional view of the semiconductor module. Reference numeral 420 denotes each semiconductor module. A plurality of semiconductor modules are two-dimensionally connected to each other by guide pins 405. The plurality of connected semiconductor modules are fixed at once by a material 424 such as a resin, thereby constituting an IC card 425. In this arrangement, wires can be easily positioned as described above, and combinations of the semiconductor modules 420 can be selected depending on desired functions. The semiconductor modules 420 can be applied to various IC cards, and the semiconductor modules 420 can be suitable for mass production because the semiconductor modules 420 can be manufactured by a relatively simple process.

In the above embodiment, although the semiconductor modules 420 have single-layered structure, two-dimensionally connected semiconductor modules can be stacked on each other. In addition, the number of the guide pins 405 is not limited to two, and three or more guide pins may be used. An optical semiconductor device and an optical passive element may be used in place of a semiconductor chip 404 and an IC chip 421, respectively, and submounts used in the prior art may be used in place of the semiconductor chip 404 and the IC chip 421, respectively. The number of semiconductor modules is not limited to one, and a plurality of semiconductor modules may be arranged in an array form.

The embodiments described above can be classified in four groups. The first group includes the embodiments shown in FIGS. 11A to 20, the second group includes the embodiment shown in FIGS. 21 to 22B, the third group includes the embodiment shown in FIGS. 23 to 27, and the fourth group includes the embodiments shown in FIGS. 28 to 39B. Although the respective embodiments or the embodiment groups have unique characteristic features, and can be regarded as inventions, aspects obtained by combining the respective embodiments or the respective groups can also be regarded as inventions. For example, the following combinations are regarded as inventions: the combination between the first embodiment group and second embodiment group; the combination between the first embodiment group and third embodiment group; the combination between the first embodiment group and the fourth embodiment group; the combination between the first embodiment group, the second embodiment group, and the third embodiment group; the combination between the first embodiment group, the second embodiment group, and the fourth embodiment group; the combination between the first embodiment group, the third embodiment group, and the fourth embodiment group; and the combination between; the first embodiment group, the second embodiment group, the third embodiment group, and the fourth embodiment group. In any combination, the first embodiment group plays an important role.

As described above, according to the present invention, when an Si cap is directly bonded on an Si submount on which an optical semiconductor device is mounted, the optical semiconductor device, an optical fiber, and an optical coupling system can be hermetically sealed at once on the Si submount on which the optical semiconductor device is mounted. For this reason, an optical semiconductor module can be manufactured to have almost the same size as that of the optical semiconductor device, and the optical semiconductor module is suitable for being integrated with an external circuit. In addition, since the optical semiconductor device, the optical fiber, and the optical coupling system are hermetically sealed in advance, the semiconductor module can be connected to an external circuit without any special consideration for the protection of the input and output surfaces of the optical semiconductor device, and productivity can be advantageously improved.

In order to prevent deformation and flexing of an optical fiber at a guide groove end portion of the optical fiber, an optical fiber is fixed on an auxiliary substrate for preventing deformation in advance, and the distal end of the optical fiber is adjusted with respect to the auxiliary substrate. For this reason, a reduction in cost and mass production of optical semiconductor modules can be remarkably achieved, and the optical semiconductor module can be applied to a general-purpose system using an optical transmission technique. Therefore, the performance of various information equipment can be greatly improved, and the present invention can contribute to the progress and development of industries.

Mounting of an optical fiber can be applied to a single-mode fiber by only mechanical positional adjustment, and a large number of optical fibers are mounted at once. For this reason, the number of manufacturing steps can be decreased, and the manufacturing time can be considerably shortened. In addition, a module array can be easily manufactured. Therefore, modules such as an optical transmission module for optical communication and an optical switch module which require optical fiber coupling can be mass-produced, and a great reduction in cost can be achieved.

vertical positioning and horizontal positioning are performed by a relatively simple mask aligning process and a selective etching process, and, in particular, the bottom surfaces of guide pins and a semiconductor chip are arranged to be in contact with the same flat silicon substrate. For this reason, a vertical positional precision defined with reference to this surface in the semiconductor module is very high.

In positioning and fixing operations, a force acting on guide pins does not act on a submount and semiconductor chip which are interposed between the guide pins. In addition, since the recessed portion for the guide pins can be arranged in all directions, semiconductor modules can be connected to each other in all the directions. When the plurality of semiconductor modules are connected to each other through the guide pins as described above, the bottom surfaces of the semiconductor chip of each semiconductor module and the guide pins are in contact with the same plane regardless of the thicknesses of the substrates of the semiconductor modules. For this reason, the connected semiconductor modules can be easily, vertically positioned. Since the semiconductor module of the present invention has the above characteristic features, the semiconductor module can be positioned with respect to other semiconductor module constituent parts at a high precision, and semiconductor modules which can be connected in all directions can be obtained.

Additional advantages and modifications will readily occur to those skilled in the art. Therefore, the invention in its broader aspects is not limited to the specific details, representative devices, and illustrated examples shown and described herein. Accordingly, various modifications may be made without departing from the spirit or scope of the general inventive concept as defined by the appended claims and their equivalents.

What is claimed is:

1. An optical semiconductor module comprising:

a semiconductor substrate having a first groove, buried with an insulator, for extending an electrical wiring layer therethrough and a second groove in which an optical fiber is to be mounted;

an optical semiconductor device mounted on said semiconductor substrate;

an optical fiber arranged in the second groove such that an optical axis of said optical fiber coincides with an optical axis of output/input light from/to said optical semiconductor device;

a cap member arranged across the first and second grooves on said semiconductor substrate and bonded and fixed to said semiconductor substrate by a bonding member, for hermetically sealing said optical semiconductor device and said optical fiber; and an electrical wiring layer arranged to extend from an outside of said cap member on said semiconductor substrate to an inside of said cap member through the groove buried with the insulator, said electrical wiring layer being electrically connected to said optical semiconductor device.

2. A module according to claim 1, wherein that portion of said cap member which is positioned between said optical semiconductor device and said optical fiber is transparent to an operation wavelength of the optical semiconductor device.

3. A module according to claim 1, wherein a lens-like body is arranged on said semiconductor substrate hermetically sealed by said cap member between said optical semiconductor device and said optical fiber.

4. A module according to claim 1, wherein said optical fiber is arranged on an auxiliary substrate and is fixed in the second groove.

5. A module according to claim 4, wherein said optical fiber is fixed in the second groove through a plastic material, and said optical fiber is not in direct contact with an inner wall of the second groove.

6. An optical semiconductor module comprising:

a compound semiconductor substrate having a first groove, buried with an insulator, for extending an electrical wiring layer therethrough and a second groove in which an optical fiber is to be mounted;

an optical semiconductor device mounted on said compound semiconductor substrate;

a cap member arranged across the first groove on said compound semiconductor substrate and bonded and fixed to said compound semiconductor substrate by a bonding member, for hermetically sealing said optical semiconductor device;

an electrical wiring layer arranged to extend from an outside of said cap member on said compound semiconductor substrate to an inside of said cap member through the groove buried with the insulator, said electrical wiring layer being electrically connected to said optical semiconductor device;

a guide pin, arranged in the second groove, for connecting said optical semiconductor module to another optical semiconductor module; and a buffer member in contact with said guide pin and formed on said compound semiconductor substrate between said guide pin and said optical semiconductor device, wherein said compound semiconductor substrate includes a body constituted by directly bonding two semiconductor substrates having smooth surfaces, the second groove is formed by etching a region of said compound semiconductor substrate outside said cap member to reach a contact portion of said semiconductor substrates.

7. A module according to claim 6, wherein said compound semiconductor substrate comprises a main semiconductor substrate, and a submount body constituted by a body obtained by directly bonding two semiconductor substrates having smooth surfaces and formed on said main semiconductor substrate.

8. A module according to claim 6, wherein said buffer member consists essentially of one selected from the group consisting of silicon, silicon nitride, silicon oxide, glass, a semiconductor material, and a polymer material.

9. A module according to claim 6, wherein two grooves are formed in said compound semiconductor substrate as the second groove, and two guide pins are mounted in the two second grooves, respectively.

10. A module according to claim 6, wherein a third groove is formed in said compound semiconductor substrate, and an optical fiber is mounted in the third groove such that an optical axis of said optical fiber coincides with an optical path of output light from said optical semiconductor device.

11. An optical semiconductor module comprising:

a main substrate having a plurality of grooves for adjusting optical axes of optical fibers;

optical fibers mounted in said grooves of said main substrate;

an optical semiconductor device mounted on said main substrate; and an auxiliary substrate for mounting and holding said optical fibers in said grooves of said main substrate in a precisely located position.

12. A module according to claim 11, wherein said optical fibers are fixed on said auxiliary substrate through a fixing material selected from the group consisting of a low-temperature-melting glass and a refractory solder.

13. A module according to claim 11, wherein said fixing material is the refractory solder selected from the group consisting of AuSn and AuGe.

14. A module according to claim 12, wherein said optical fibers are fixed in said groove through either one of a solder and a resin having a melting point lower than that of said fixing material.

15. A module according to claim 12, wherein said optical fibers are fixed in said groove through either one of a solder and a resin having a hardening temperature lower than that of said fixing material.

16. A module according to claim 11, wherein the auxiliary substrate and the optical fibers have ends aligned on a same plane.

* * * * *